(12) United States Patent
Oyama et al.

(10) Patent No.: US 8,922,785 B2
(45) Date of Patent: Dec. 30, 2014

(54) METHOD AND APPARATUS FOR MEASURING DISPLACEMENT

(75) Inventors: Katsuhiro Oyama, Tokyo (JP); Masato Ikeda, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 305 days.

(21) Appl. No.: 13/619,103

(22) Filed: Sep. 14, 2012

(65) Prior Publication Data
US 2013/0010305 A1    Jan. 10, 2013

Related U.S. Application Data

(63) Continuation of application No. PCT/JP2011/057560, filed on Mar. 28, 2011.

(30) Foreign Application Priority Data

Mar. 31, 2010    (JP) ................................. 2010-083537

(51) Int. Cl.
| | |
|---|---|
| G01B 11/02 | (2006.01) |
| G01B 11/00 | (2006.01) |
| B60T 17/22 | (2006.01) |
| B62K 23/06 | (2006.01) |
| B62M 6/50 | (2010.01) |
| B60L 3/00 | (2006.01) |
| B60L 7/12 | (2006.01) |
| B60L 7/24 | (2006.01) |
| B60L 11/00 | (2006.01) |

(52) U.S. Cl.
CPC ............. G01B 11/002 (2013.01); B60T 17/221 (2013.01); B62K 23/06 (2013.01); B62M 6/50 (2013.01); B60L 3/0076 (2013.01); B60L 7/12 (2013.01); B60L 7/24 (2013.01); B60L 11/007 (2013.01); *B60L 2200/12* (2013.01)
USPC ......................................................... 356/499

(58) Field of Classification Search
CPC . G01B 2290/30; G01B 11/14; G01B 11/0675
USPC .................. 356/499, 494, 488, 505, 521, 519
See application file for complete search history.

(56) References Cited

U.S. PATENT DOCUMENTS

| | | | |
|---|---|---|---|
| 5,619,326 A | 4/1997 | Takamatsu et al. | |
| 8,730,483 B2 * | 5/2014 | Ikeda et al. | 356/499 |
| 2001/0017696 A1 * | 8/2001 | Narita et al. | 356/499 |

FOREIGN PATENT DOCUMENTS

JP    5001926    1/1993
(Continued)

OTHER PUBLICATIONS

Office Action in corresponding Korean Application No. 10-2012-7023588, dated Nov. 20, 2013, along with an English translation.
(Continued)

*Primary Examiner* — Hwa Lee
(74) *Attorney, Agent, or Firm* — Edell, Shapiro and Finnan LLC

(57) ABSTRACT

A technique for measuring displacement involves passing parallel laser light from a laser light source through a first diffraction grating to a semi-transparent semi-reflective mirror. A portion of the laser light is reflected as first reversed light, which passes through the first diffraction grating. The remainder of the parallel laser light proceeds to a total reflection mirror and is reflected as second reversed light that passes through the semi-transparent semi-reflective mirror and the first diffraction grating. The amount of refracted light of a predetermined order that is of the first and second reversed light and that results from the first diffraction grating is detected by a first optical sensor, and the amount of displacement is obtained from the interference band or a signal thereof corresponding to the amount of relative motion in the axial direction of the total reflection mirror with respect to the semi-transparent semi-reflective mirror.

8 Claims, 22 Drawing Sheets

(56) References Cited

FOREIGN PATENT DOCUMENTS

| | | |
|---|---|---|
| JP | 11083433 | 3/1999 |
| JP | 2005147828 | 6/2005 |
| JP | 2007271624 | 10/2007 |
| KR | 10-0163627 | 9/1998 |

OTHER PUBLICATIONS

International Search Report in counterpart International Application No. PCT/JP2011/057560, mailed Apr. 26, 2011.
Office Action in corresponding Japanese Application No. 2010-083537, dated Sep. 3, 2013, along with an English translation.

* cited by examiner

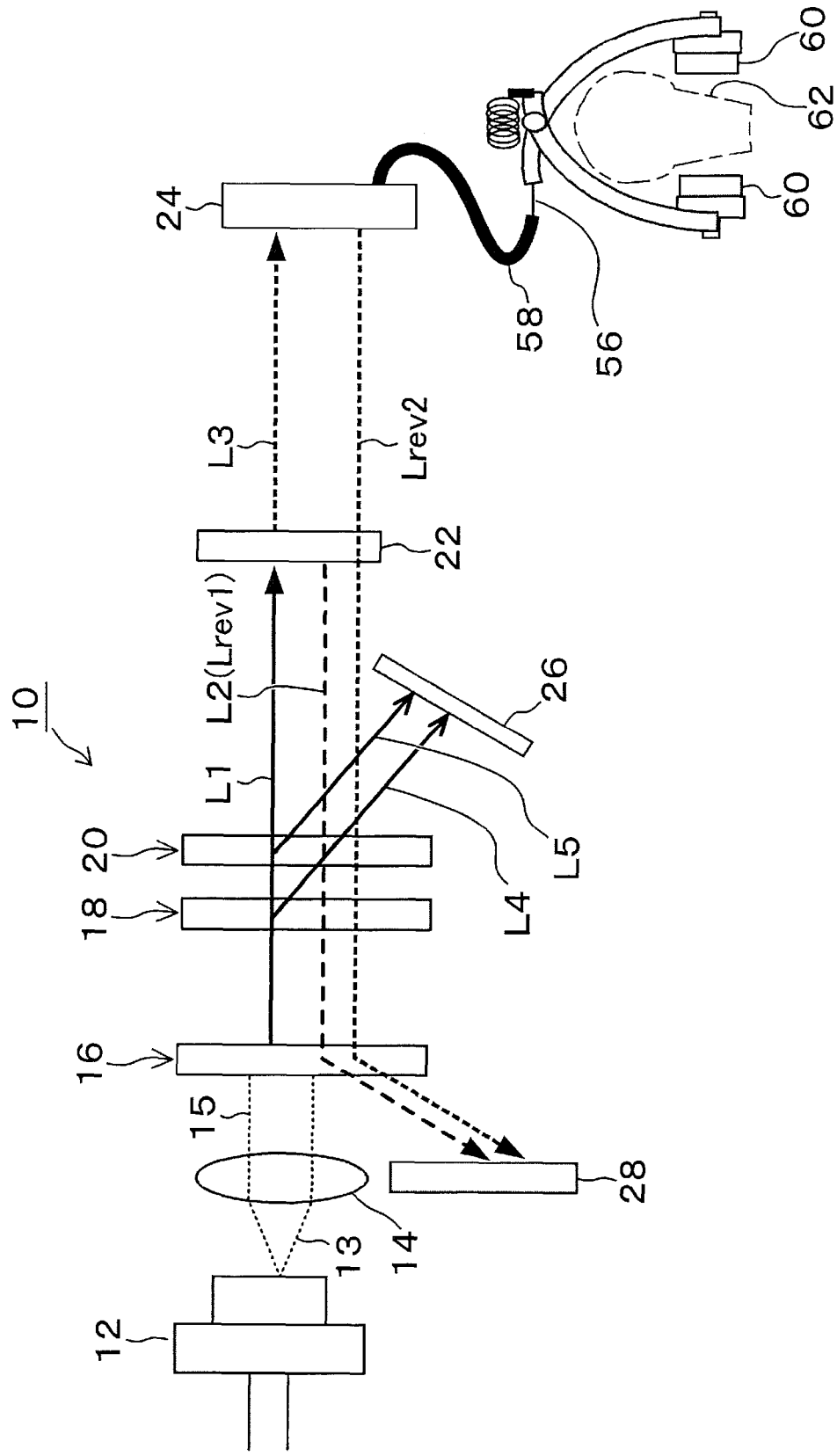

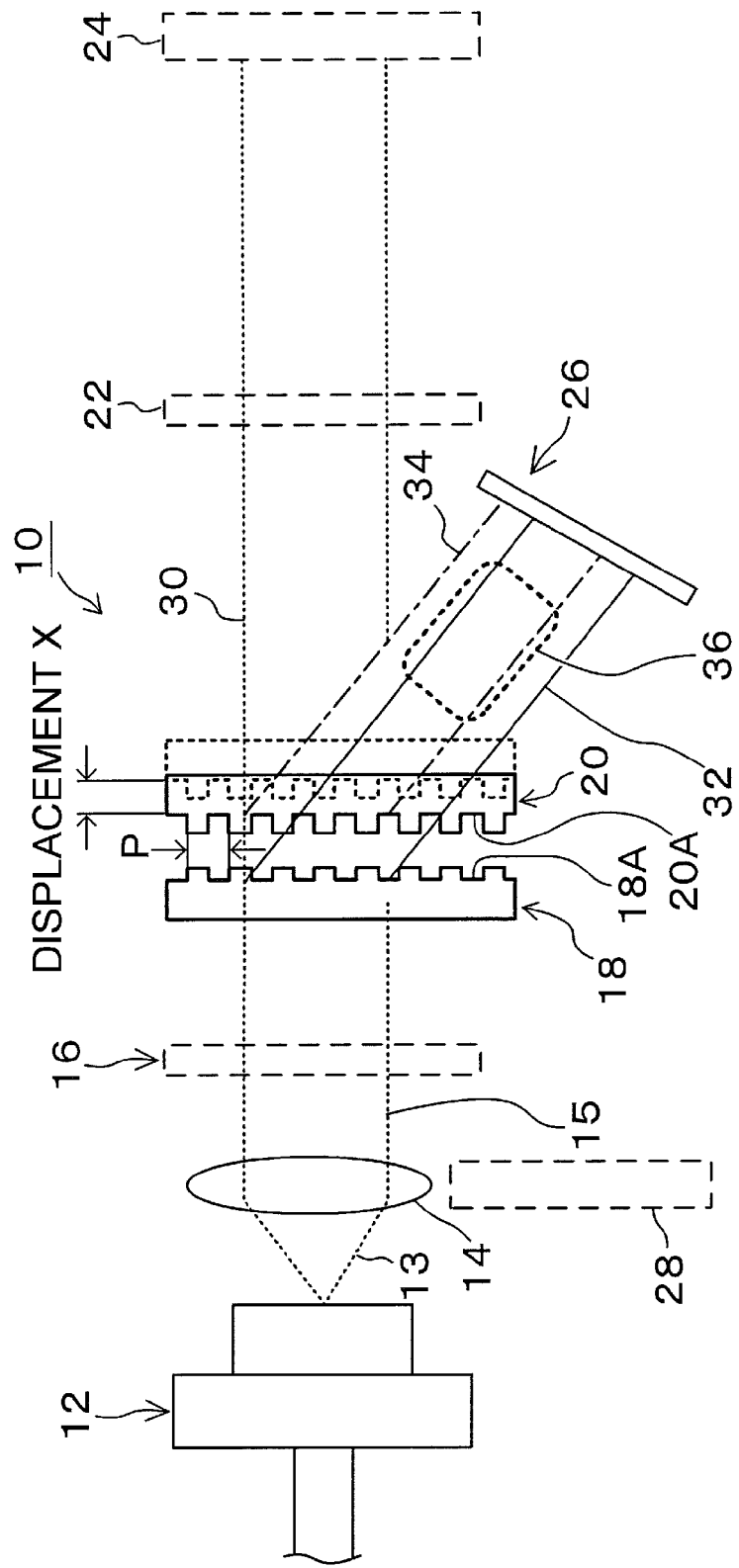

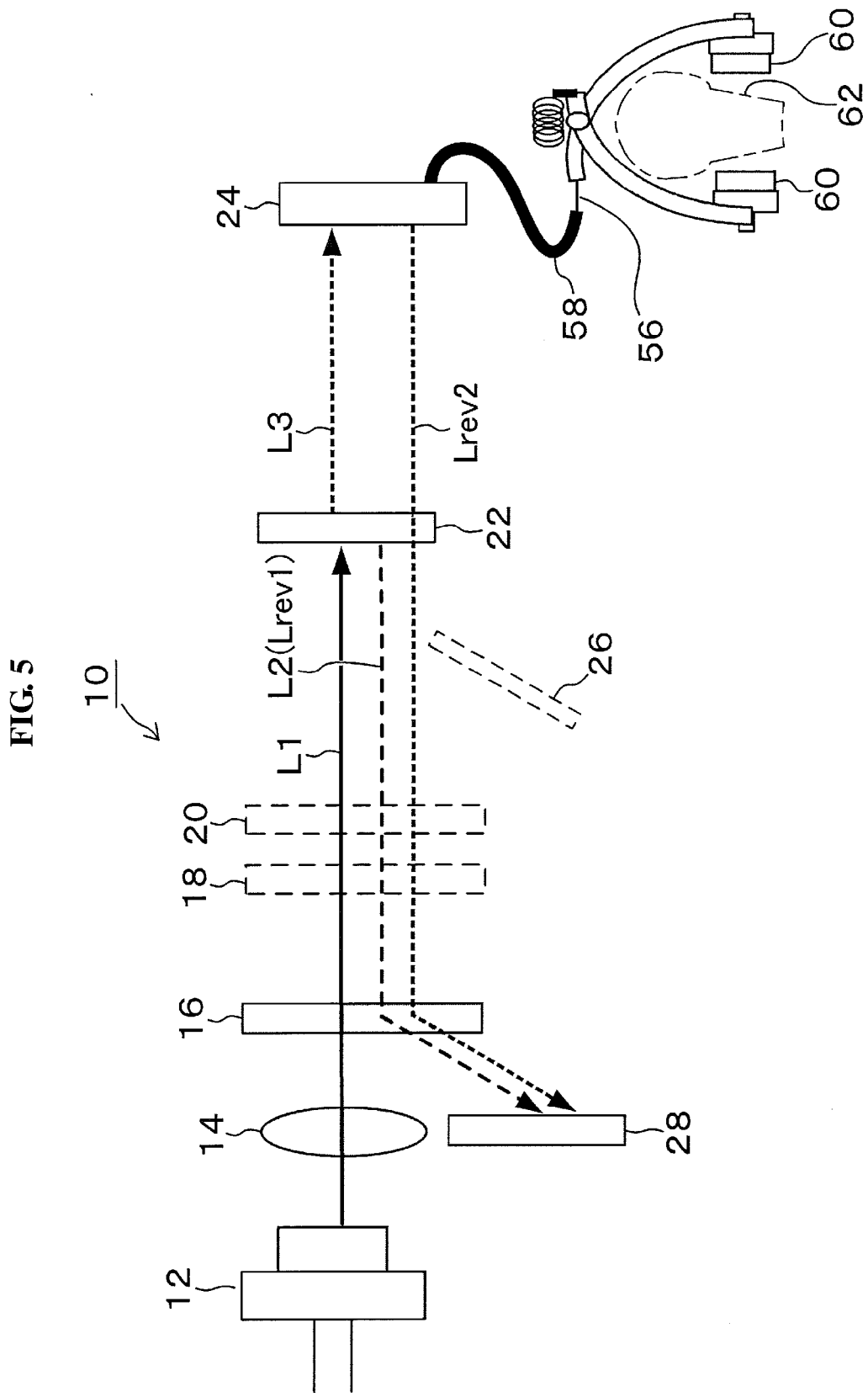

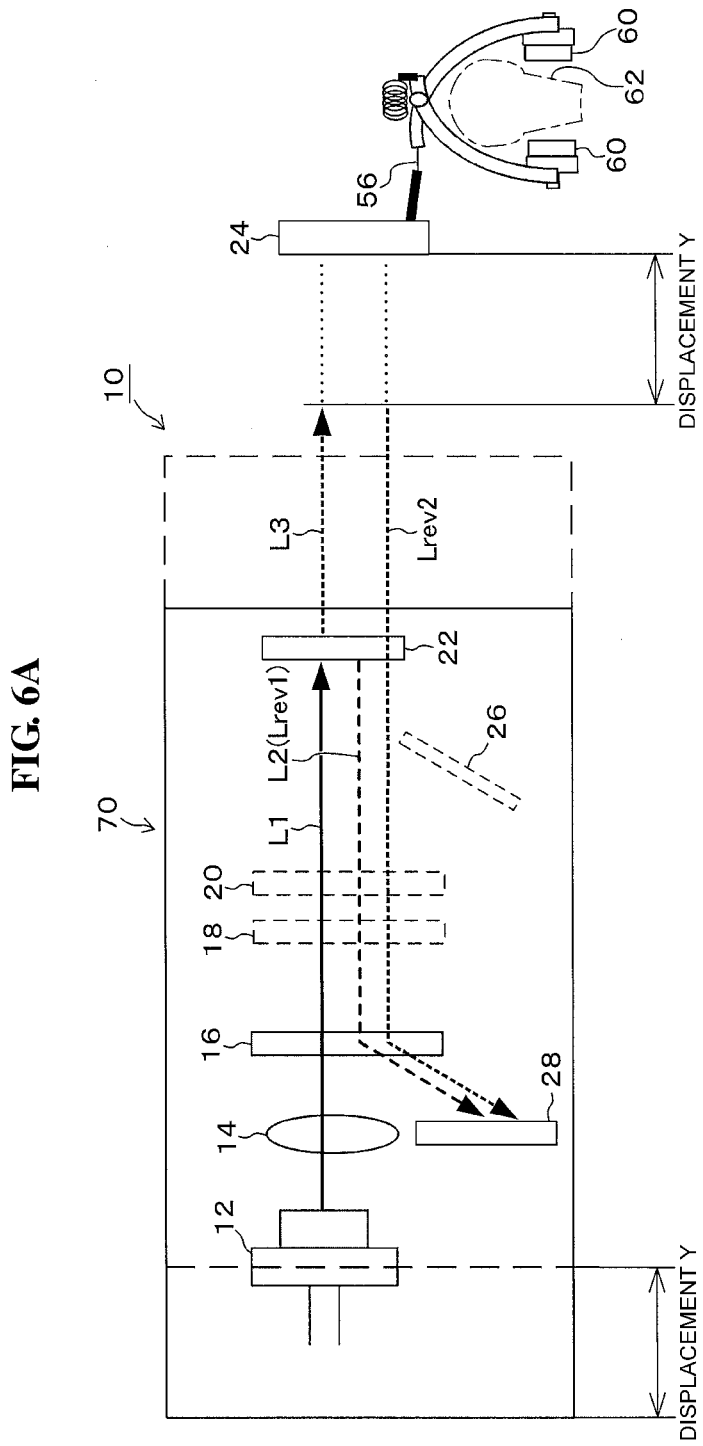

BRIGHT:
MAXIMUM INTENSITY
INITIAL PERIOD    F1

INTERMEDIATE
INTENSITY
$0 < Y < \lambda/4 \times (2n+1)$    F2

DARK:
MINIMUM INTENSITY    F3
$Y = \lambda/4 \times (2n+1)$

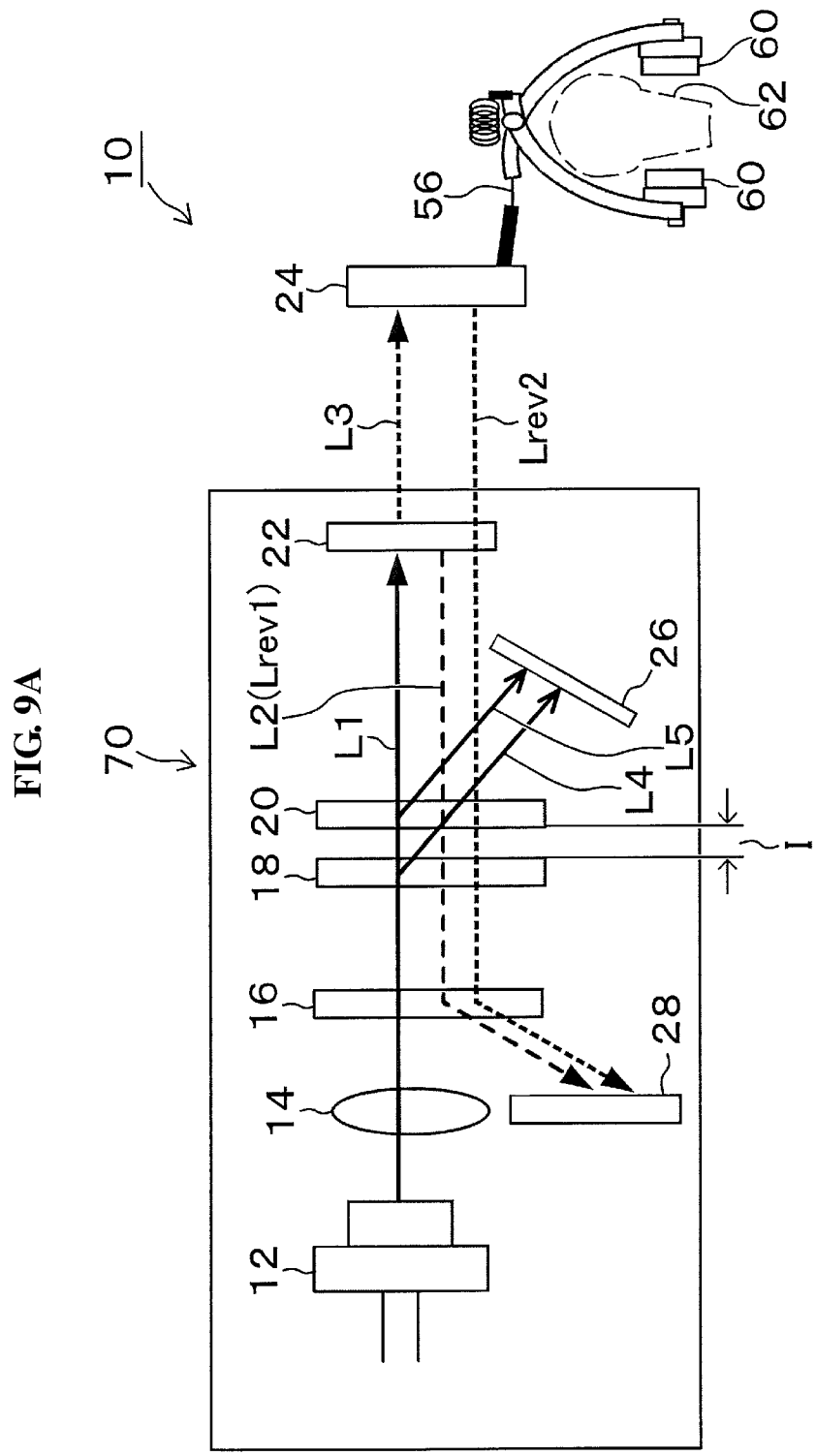

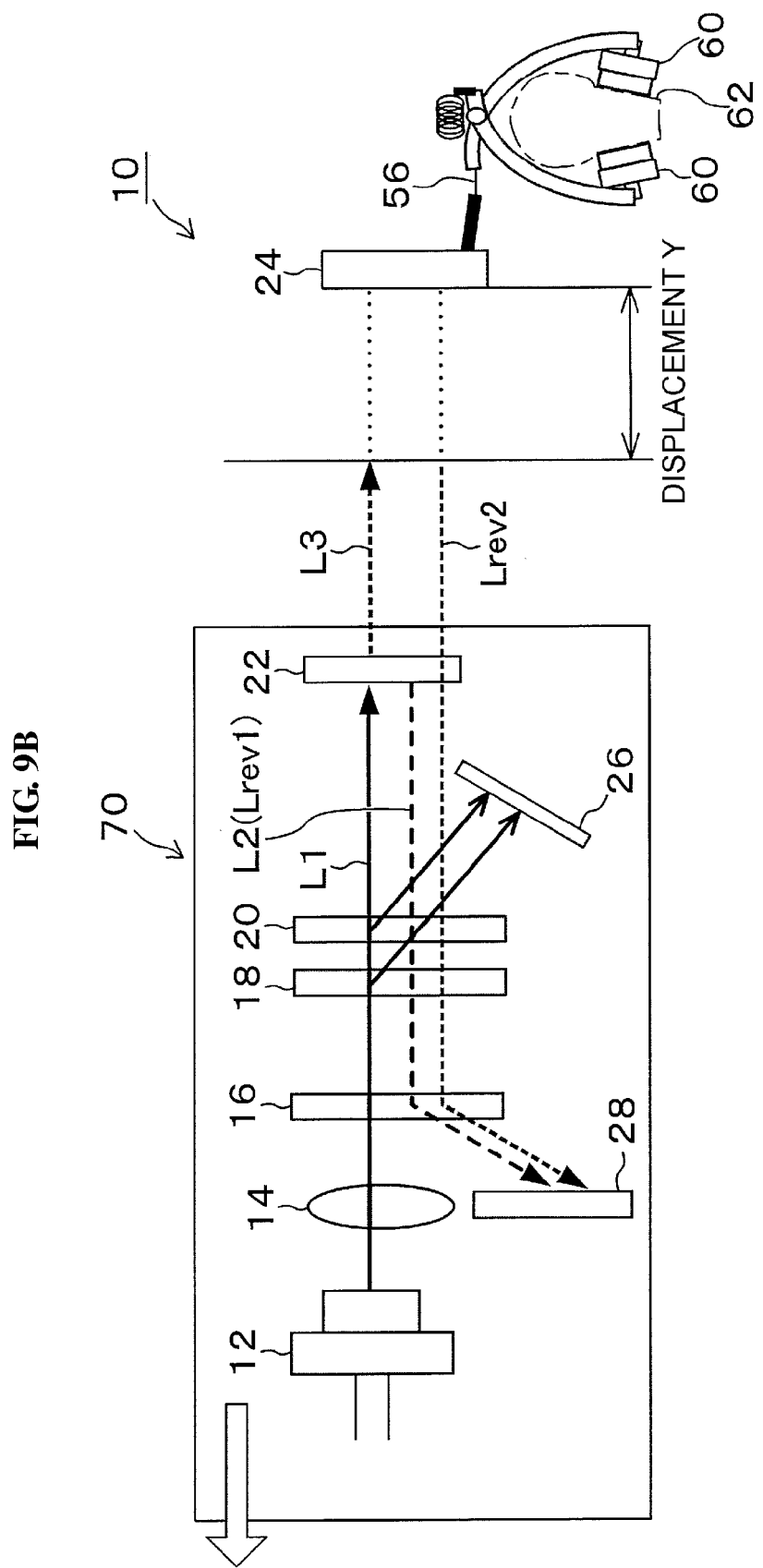

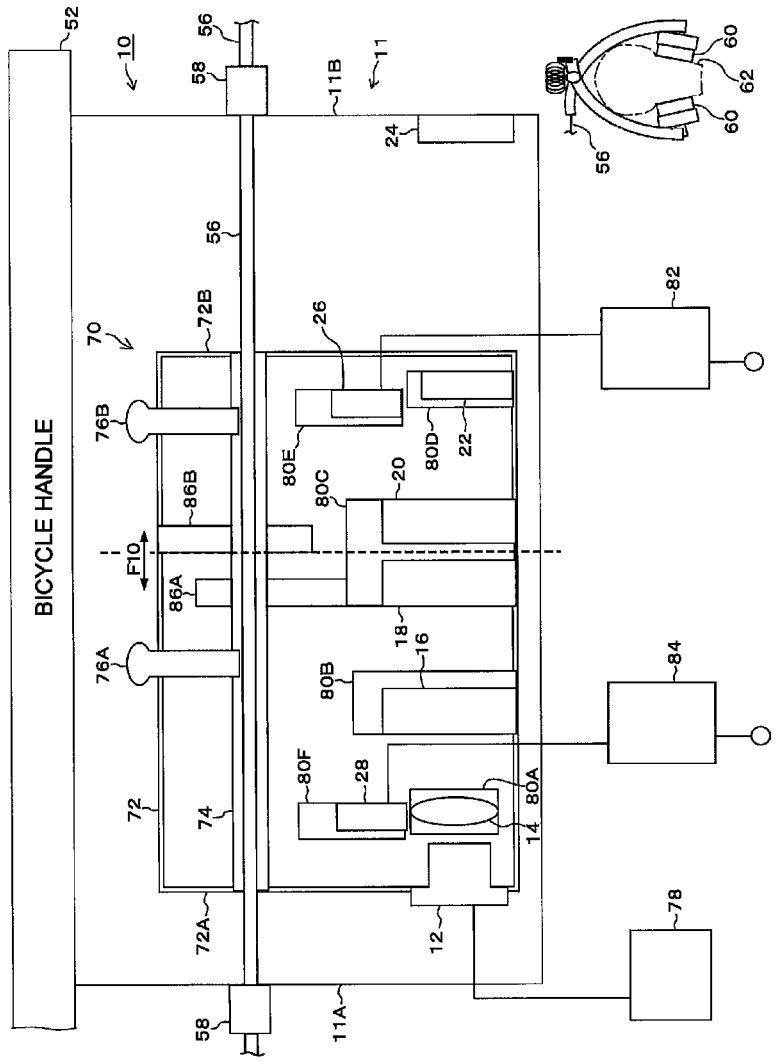

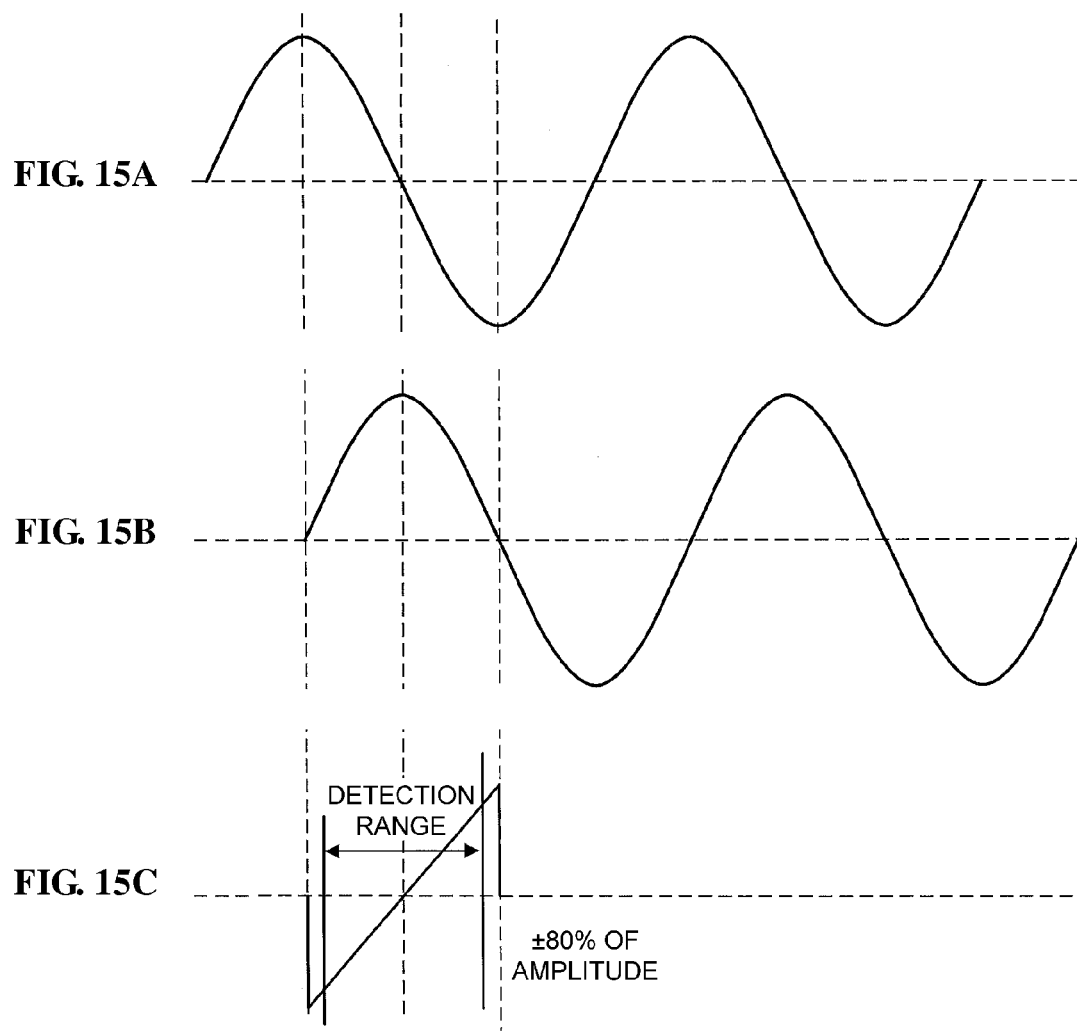

<PRIOR ART>

<PRIOR ART>

<PRIOR ART>

<PRIOR ART>

<PRIOR ART>

METHOD AND APPARATUS FOR MEASURING DISPLACEMENT

CROSS REFERENCE TO RELATED APPLICATIONS

This application is a continuation of International Application No. PCT/JP2011/057560, filed on Mar. 28, 2011, entitled "Displacement Measurement Method, and Displacement Measuring Device," which claims priority under 35 U.S.C. §119 to Application No. JP 2010-083537 filed on Mar. 31, 2010, entitled "Method and Apparatus for Measuring Displacement," the entire contents of which are hereby incorporated by reference.

FIELD OF THE INVENTION

The present invention relates to a method and an apparatus for measuring a displacement, and more particularly to a method and an apparatus for measuring a displacement with an extended measurement range.

BACKGROUND

Recently, people who travel in automobiles are paying attention to electric power-assisted bicycles for their health and the environment. Among the electric power-assisted bicycles, a bicycle capable of energy regeneration and long distance travel with a single charging came into focus. Generally, a regenerative charging is performed after a braking is applied. However, energy efficiency is low when regenerative charging is performed after the braking is applied. Therefore, it is preferable that the regenerative charging starts once a brake lever is pulled before a mechanical brake is actually applied. In order to achieve this, means capable of detecting the pulling of the brake lever before the mechanical brake is actually applied, i.e., a tension of a brake wire, and capable of measuring a small amount of movement (displacement) proportional to the tension of the brake wire is necessary.

FIGS. 16A and 16B show relationships between an amount of manipulation of a brake lever and a braking force in an electric power-assisted vehicle. For the electric power-assisted bicycle described above, it is necessary to measure the amount of manipulation of the brake lever corresponding to an amount the movement of the brake wire in an idle period shown in FIG. 16A when the pulling of the brake lever starts. Next, it is necessary to detect a point (an operation point P1 of the mechanical braking) where a brake pad starts the mechanical braking of the bicycle by inhibiting the rotation of wheels based on the extension of the brake wire. This is due to the fact that rider(s) may feel as if the bicycle underwent an abrupt braking or the braking force were insufficient when a braking control between the regenerative braking and the mechanical braking is not performed smoothly before and after the braking.

In particular, an idle period of a brake in an electric power-assisted bicycle or the like can change by replacing braking wires or by adjusting the tension of the brake wire. Accordingly, as shown in FIG. 16B, the amount of manipulation of the brake lever required for starting the mechanical braking may easily deviate from the operation point P1 to another operation point P2 of the mechanical brake. According to the prior art, only the amount of manipulation of the brake lever is detected, and start of the mechanical braking is determined when the detected amount of manipulation reaches a predetermined amount. Therefore, according to the prior art, since the start of mechanical braking cannot be accurately detected even when the operation point is changed to P2 as described above, the braking control cannot be performed smoothly between the regenerative braking and the mechanical braking. In order to maximize the efficiency of the regenerative charging, a configuration is necessary wherein the start of mechanical braking is precisely detected by simultaneously or sequentially measuring both the amount of movement and an amount of the extension of the brake wire.

Conventionally, an optical interferometer is used to measure a minute displacement such as the amount of the movement or the amount of the extension of the brake wire. A Michelson interferometer 200 shown in FIG. 17A includes a laser light source 202; a collimating lens 204 configured to convert an incident beam of laser light into a parallel beam; a splitter 206 configured to divide a beam into two beams and direct one beam to a fixed minor 208 and the other beam to a movable mirror 210; and an optical sensor 212 configured to receive an interference beam of the two reflected beams. In the Michelson interferometer 200, a detector detects two optical patterns of bright and dark bands when the movable mirror 210 moves one wavelength with respect to a fixed unit 214 in a direction of beam propagation. As shown in FIG. 17B, these optical interference fringes are observed as interference patterns 216. In this case, a displacement not greater than the one wavelength may be detected by detecting a voltage gradient of the interference fringe. In addition, a displacement greater than the one wavelength may be measured by counting the number of the interference fringes (i.e., the interference patterns). As shown in FIG. 17C, the displacement may be calculated by equation: [displacement]=[the one wavelength]× [the number of interference fringes]×2 because path difference in round trip is twice the displacement of the movable mirror. Here, additional means are necessary to detect the direction of the movement of the brake wire. Techniques using optical interference such as a device and a method of detecting a phase difference described above are disclosed in the following Patent Document 1: Japanese Patent Laid-Open Publication No. 2007-271624.

SUMMARY

However, the above-described conventional interferometer has following disadvantages:
(1) A measurement range is determined by the wavelength of light. That is, since the displacement is measured by counting the number of wavelengths of transmitted light, the displacement can be measured only within a range larger than or equal to a wavelength of light. As a result, it is not possible to achieve a resolution below the wavelength of light.
(2) Since the conventional interferometer is very sensitive to the positional precision of optical devices therein, the displacement sometimes cannot be measured due to a deviation in angle (order of 0.01°) or a deviation in position (order of sub-nm). As a result, it is necessary to prevent detection errors caused by environmental variables such as variations in temperature, humidity, external vibration and a lapse of time.
(3) It is difficult to miniaturize the interferometer because a collimating lens, a combination of mirrors, and a splitter are required.
(4) It is impossible to simultaneously or sequentially measure a displacement (e.g., the amount of movement and the amount of the extension of the brake wire in the electric power-assisted bicycle as described above) with different detection sensitivities or in different detection positions.

In order to solve the disadvantages, it is an object of the present invention to provide a method and apparatus for measuring displacement unaffected by a precision of an optical device, of a simple configuration, miniaturizable, highly robust to a positional deviation, and with adjustable optical resolution. It is another object of the present invention to provide a method and apparatus for measuring displacement capable of simultaneously or sequentially measuring a displacement with different detection sensitivities or in different detection positions.

According to a first aspect of the present invention, there is provided a method for measuring a displacement, the method comprising: generating a first reflected beam and a transmitted beam from an incidence of a parallel beam upon a first diffraction grating and a semi-reflective mirror in sequence, the first diffraction grating and the semi-reflective mirror being disposed along an optical axis, wherein the first reflected beam is generated by a reflection of the parallel beam by the semi-reflective mirror and the transmitted beam is generated by a transmission of the parallel beam by the semi-reflective mirror; generating a second reflected beam by a reflection of the transmitted beam by a total reflection mirror movable along the optical axis; dividing the first reflected beam into a first $0^{th}$ order beam propagating in a direction same as that of the first reflected beam and a first $\pm n^{th}$ order beam having a diffraction angle with respect to the first $0^{th}$ order beam by an incidence of the first reflected beam upon the first diffraction grating; dividing the second reflected beam into a second $0^{th}$ order beam and a second $\pm n^{th}$ order beam having a diffraction angle with respect to the second $0^{th}$ order beam by an incidence of the second reflected beam upon the first diffraction grating; and measuring a first displacement in a direction of the optical axis from a first light intensity obtained by receiving an interference beam of the first $\pm n^{th}$ order beam and the second $\pm n^{th}$ order beam.

According to a second aspect of the present invention, there is provided an apparatus for measuring a displacement, the apparatus comprising: a light source configured to generate a parallel beam; a total reflection mirror facing the light source, the total reflection mirror being movable along an optical axis of the parallel beam; a semi-reflective mirror disposed along the optical axis between the light source and the total reflection mirror; a first diffraction grating disposed along the optical axis between the light source and the semi-reflective mirror; and a first sensor configured to measure a light intensity, wherein the semi-reflective mirror generates a first reflected beam and a transmitted beam by reflecting and transmitting the parallel beam, respectively, the total reflection mirror generates a second reflected beam by reflecting the transmitted beam, the first diffraction grating divides the first reflected beam into a first $0^{th}$ order beam propagating in a direction same as that of the first reflected beam and a first $\pm n^{th}$ order beam having a diffraction angle with respect to the first $0^{th}$ order beam and the second reflected beam into a second $0^{th}$ order beam and a second $\pm n^{th}$ order beam having a diffraction angle with respect to the second $0^{th}$ order beam, and the first sensor measures a first light intensity by receiving an interference beam of the first $\pm n^{th}$ order beam and the second $\pm n^{th}$ order beam.

The foregoing and other objects, features and advantages of the present invention will be apparent from the detailed description and the accompanying drawings in the following.

According to the present invention, it is possible to provide a method and a device for measuring displacement which are unaffected by a precision of a diffraction grating, hardly affected by positional deviation in a plane on which the diffraction grating is placed, of a simple configuration, miniaturizable, and with adjustable optical resolution. In addition, a displacement at different positions can be measured with a single light source in accordance with the present invention.

BRIEF DESCRIPTION OF THE DRAWINGS

FIG. 1 is a schematic diagram of a basic structure of an apparatus for measuring displacement according to a first embodiment of the present invention.

FIGS. 2A through 2E are schematic diagrams of the apparatus for measuring displacement according to the first embodiment, wherein FIG. 2A is a schematic diagram of a basic structure of a wire extension detection unit, FIGS. 2B and 2C illustrate light paths L4 and L5, respectively, and FIGS. 2D and 2E illustrate interferences between the light paths L4 and L5.

FIG. 5 is a diagram qualitatively illustrating an operation principle of the displacement measurement by a wire movement detection unit according to the first embodiment.

FIG. 6A is a diagram quantitatively illustrating the operation principle of the displacement measurement by the wire movement detection unit.

FIGS. 9A through 9C are diagrams illustrating functions of the apparatus for measuring displacement and a braking operation of the electric power-assisted bicycle.

FIG. 10 depicts an example of a displacement measuring unit according to the first embodiment.

FIGS. 14A and 14B illustrate an apparatus for measuring displacement according to a second embodiment of the present invention, wherein FIG. 14A illustrates a basic structure of the apparatus for measuring displacement, and FIG. 14B illustrates a circuit diagram of an optical detection circuit in the apparatus for measuring displacement.

FIGS. 15A and 15B are signal waveform diagrams of outputs A and B of the optical detection circuit, respectively, according to the second embodiment, and FIG. 15C is a signal waveform diagram showing a result of an operation between the outputs A and B.

DETAILED DESCRIPTION

Hereinafter, the present invention will be described in detail with reference to the following embodiments.

Figure 6B:
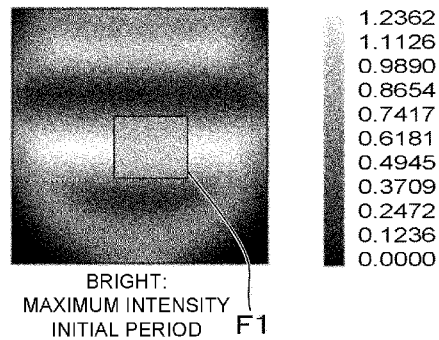
FIGS. 6B through 6D show images of interference fringes of an interference beam detected by an optical sensor.
Figure 6C:
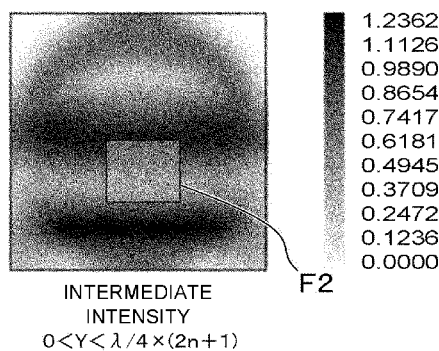
Figure 6D:
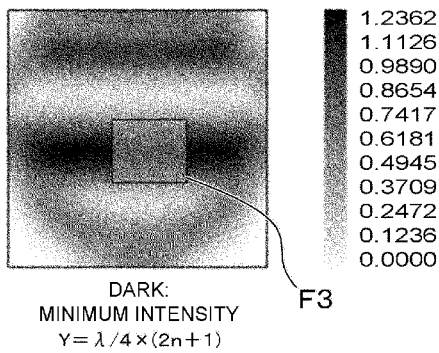
Figure 7:
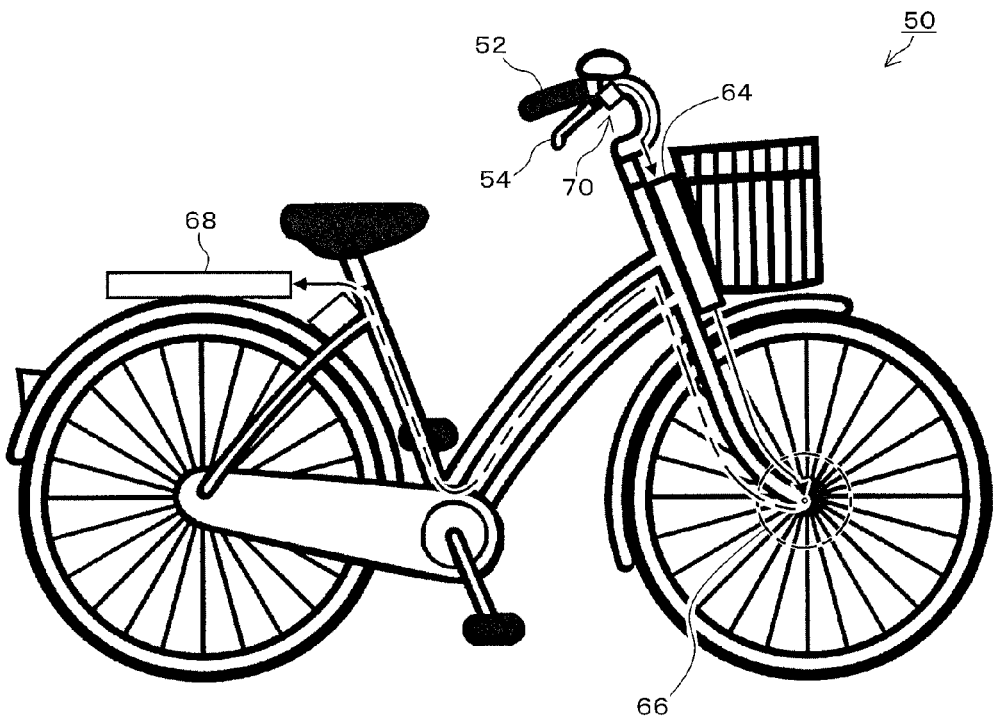
FIG. 7 is a diagram of an overall configuration of an electric power-assisted bicycle using the apparatus for measuring displacement according to the first embodiment.
Figure 8A:
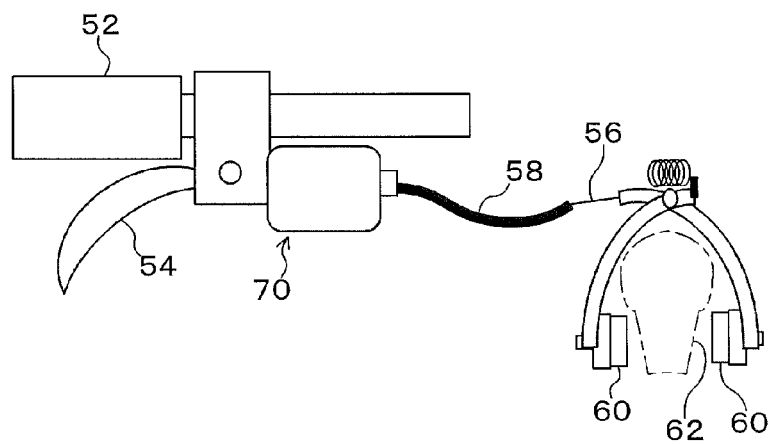
FIGS. 8A through 8C are schematic diagrams of a brake mechanism in the electric power-assisted bicycle.
Figure 8B:
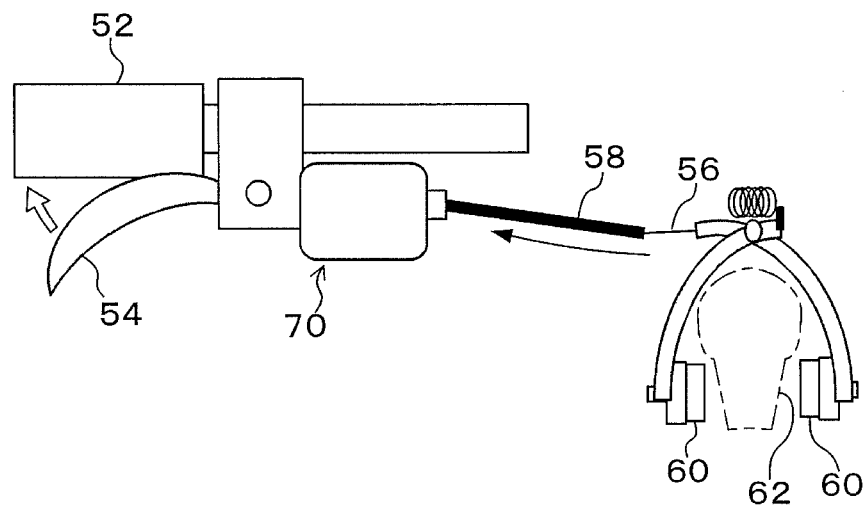
Figure 8C:
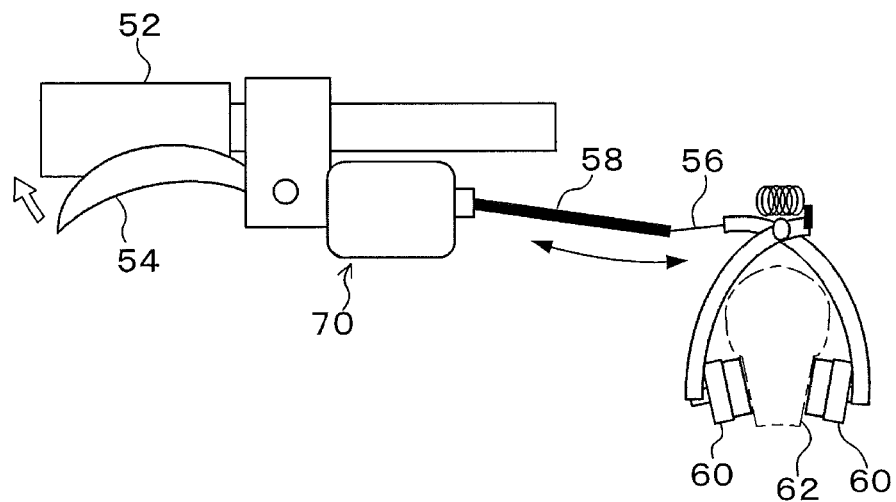

First, a basic structure in accordance with a first embodiment of the present invention will be described with reference to FIGS. 1, 6A through 6D, 7, and 8A through 8C. In the first embodiment, a displacement measurement according to the present invention is applied to measurements of an amount of an extension and an amount of a movement of a brake wire in an electric power-assisted bicycle. FIG. 1 is a schematic diagram of the basic structure according to the first embodiment, FIG. 7 illustrates an overall configuration of the electric power-assisted bicycle, and FIGS. 8A through 8C are diagrams schematically illustrating a brake mechanism in the electric power-assisted bicycle. As shown in FIG. 1, an apparatus 10 for measuring displacement in accordance with the first embodiment includes a laser light source 12 such as a laser diode; a collimating lens 14 configured to convert laser light 13 emitted by the laser light source 12 into a parallel beam 15; first, second and third diffraction gratings 16, 18 and 20 disposed in order along an optical axis of the parallel beam 15, a semi-reflective mirror 22; a total reflection mirror 24; and optical sensors 26 and 28. The above elements except the total reflection mirror 24 may be configured as a displacement measuring unit 70 capable of moving as a single body as shown in FIG. 6. Further, as shown in FIGS. 7 and 8A through 8C, an electric power-assisted bicycle 50 may include a handle 52; a brake mechanism having a brake lever 54, a brake wire 56 covered by a tube 58, a brake pad 60 and a rim 62; a controller 64; a motor 66; and a battery 68. As shown in FIG. 7, the displacement measuring unit 70 may be installed, for example, near the brake lever 54 in the electric power-assisted bicycle 50.

As shown in FIG. 8A, the brake mechanism has a well-known configuration wherein a tension is applied to the brake wire 56 by manipulating the brake lever 54 to push the brake pad 60 against the rim 62. In an idle period during which the pulling of the brake lever 54 starts, the brake wire 56 moves as shown in FIG. 8B. In a mechanical braking period during which the brake pad 60 is in contact with the rim 62 in order to apply a mechanical braking, the brake wire 56 extends as shown in FIG. 8C. in accordance with the first embodiment, a wire extension detection unit including the laser light source 12, the collimating lens 14, the second diffraction grating 18, the third diffraction grating 20, and the second optical sensor 26 detects an amount of extension of the brake wire 56 shown in FIG. 8C, and measures an amount of manipulation of the brake corresponding to the amount of extension.

Figure 16A:
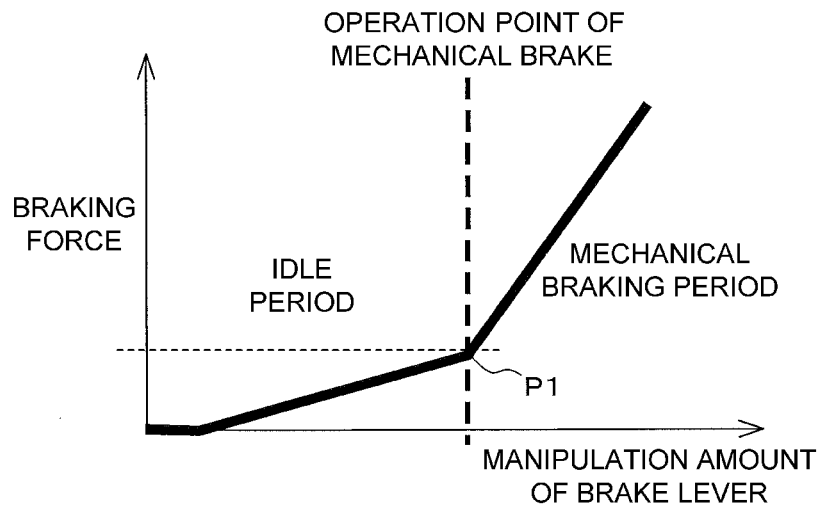
FIG. 16A is a diagram for illustrating a relationship between an amount of manipulation of a brake lever and a braking force in an electric power-assisted vehicle.
Figure 16B:
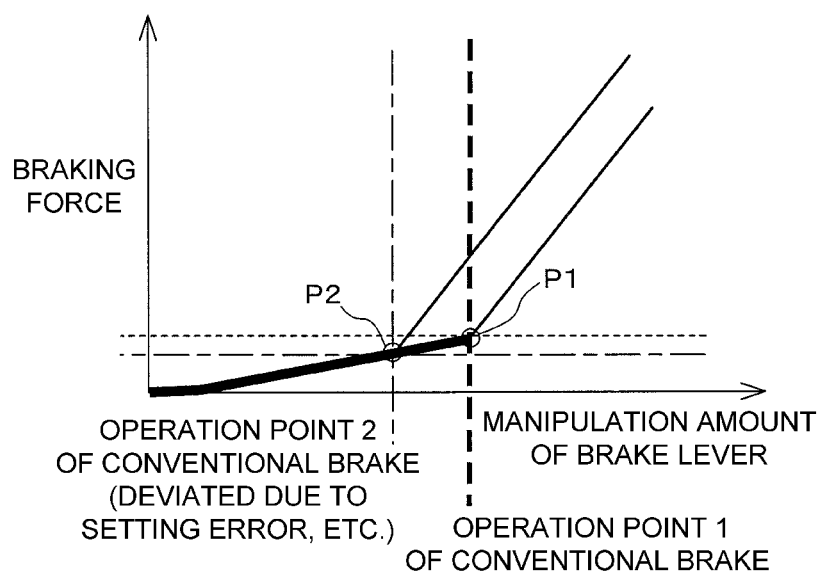
FIG. 16B is a diagram illustrating a relationship between the amount of manipulation and the braking force when a brake operation point is changed.
Figure 17A:
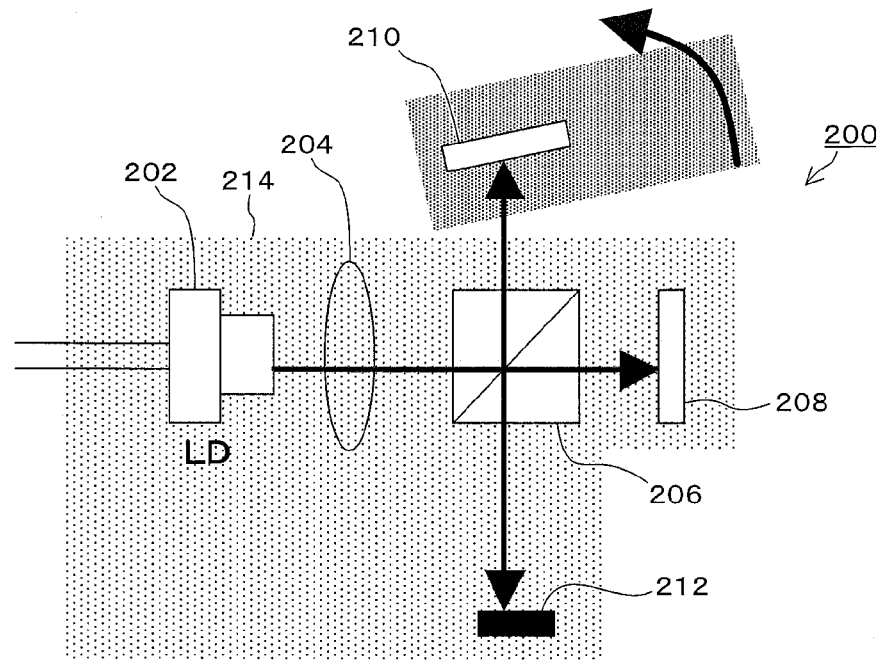
FIGS. 17A through 17C illustrate exemplary prior arts.
Figure 17B:
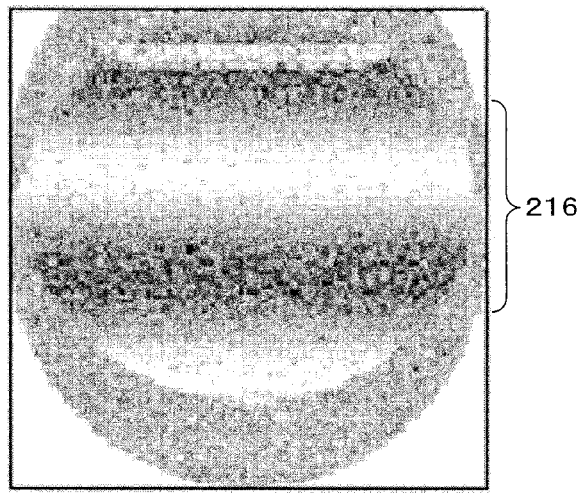
Figure 17C:
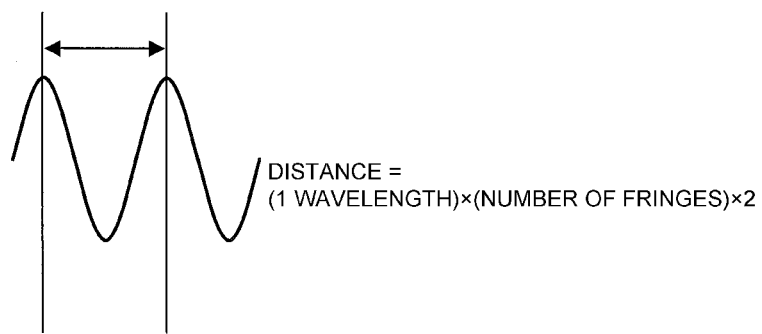

Further, a wire movement detection unit including the laser light source 12, the collimating lens 14, the first diffraction grating 16, the semi-reflective mirror 22, the total reflection mirror 24, and the first optical sensor 28 detects an amount of movement of the brake wire 56 shown in FIG. 8B, and measures the amount of manipulation of the brake. In accordance with the first embodiment, the two detection units are installed to enable simultaneous (or sequential) measurement of the amount of extension and the amount of movement of the brake wire using the single light source. Thus, an operation point P1 or P2 of the mechanical braking shown in FIGS. 16A and 16B can be accurately detected, and an efficiency of regenerative charging can be improved by maximizing a regeneration during the idle period.

Among the two detection units, the wire extension detection unit will now be described. The parallel beam 15 passed through the first diffraction grating 16, the second diffraction grating 18 and the third diffraction grating 20 is divided into a $0^{th}$ order beam (i.e., diffracted beam of $0^{th}$ order) propagating in the same direction as the parallel beam 15 and $\pm n^{th}$ order beams (i.e., diffracted beams of $\pm n^{th}$ order, where n is a natural number) having a diffraction angle with respect to the $0^{th}$ order beam by each diffraction grating. Hereinafter, the $0^{th}$ order beam propagating in the same direction as the parallel beam 15 after passing through the first diffraction grating 16, the second diffraction grating 18 and the third diffraction grating 20 will be referred to as a straight beam 30.

Figure 2B:
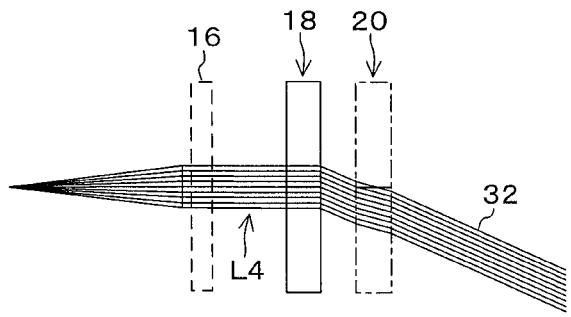
Figure 2C:
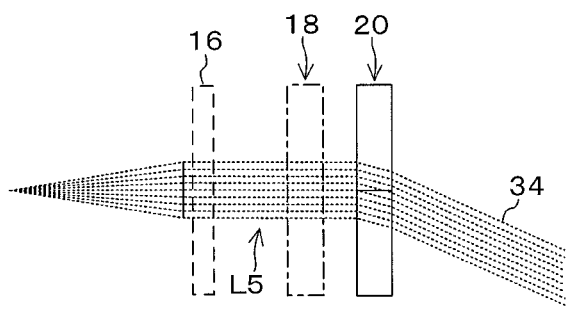
Figure 2D:
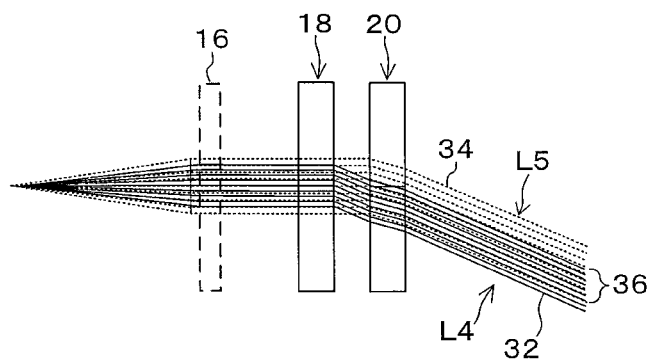
Figure 2E:
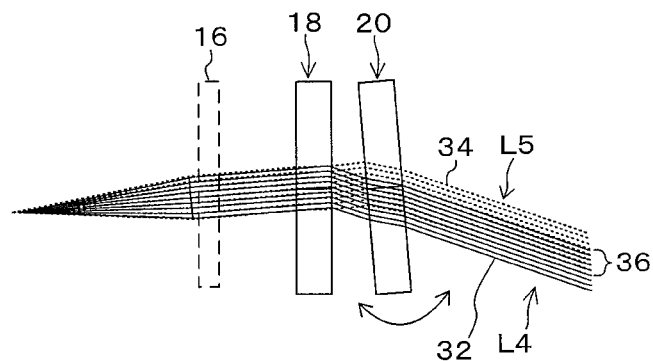

FIG. 2A is a schematic diagram of a basic structure of the wire extension detection unit, FIGS. 2B and 2C illustrate a light path L4 and a light path L5, respectively, and FIGS. 2D and 2E illustrate interferences between the light paths L4 and L5. In the wire extension detection unit, the second diffraction grating 18 divides the straight beam 30 passed through the first diffraction grating 16 into the straight beam 30 and a diffracted beam 32. The third diffraction grating 20 has a grating pitch P equal to that of the second diffraction grating 18. The third diffraction grating 20 faces the second diffraction grating 18 and is disposed to be movable with respect to the second diffraction grating 18 along the optical axis of the straight beam 30. The third diffraction grating 20 divides the straight beam 30 passed through the second diffraction grating 18 into the straight beam 30 and the diffracted beam 34. A photodiode or the like is used as the optical sensor 26. More specifically, the diffracted beam 32 is obtained by the following: First, the parallel beam 15 incident upon the first diffraction grating 16 is divided into a first $0^{th}$ order beam propagating in a direction same as that of the parallel beam 15 and a first $\pm n^{th}$ order beam having a diffraction angle with respect to the first $0^{th}$ order beam. Thereafter, the first $0^{th}$ order beam incident upon the second diffraction grating 18 is divided into a second $0^{th}$ order beam propagating in a direction same as that of the first $0^{th}$ order beam and a second $\pm n^{th}$ order beam having a diffraction angle with respect to the second $0^{th}$ order beam. Finally, the second $0^{th}$ order beam incident upon the third diffraction grating 20 is to obtain a third $0^{th}$ order beam propagating in a direction same as that of the second $1^{st}$ order beam as the diffracted beam 32. In addition, the first $0^{th}$ order beam and the second $0^{th}$ order beam are obtained from the parallel beam 15 incident upon the first diffraction grating 16 and the second diffraction grating 18 in sequence, and the third $1^{st}$ order beam is obtained from the second $0^{th}$ order beam incident upon the third diffraction grating 20 as the diffracted beam 34. Although $1^{st}$ order beams are used in the first embodiment, the displacement may be measured using a diffracted beam of different order.

The second diffraction grating 18 and the third diffraction grating 20 include a plurality of grooves 18A and a plurality of grooves 20A having a predetermined pitch (i.e., the grating pitch P in FIG. 2A), respectively, and have the same diffraction direction. In addition, the optical sensor 26 detect an intensity of an interference beam 36 generated by an interference between the received diffracted beams 34 and 32 having the same order and the same optical axis. A signal representing an interference pattern such as "bright" and "dark" is generated in response to the detected intensity of the interference beam 36. An axial displacement between the second diffraction grating 18 and the third diffraction grating 20, i.e. an axial displacement of the parallel beam 15, is measured from the signal representing the interference pattern corresponding to an amount of movement (a displacement X shown in FIG. 2A) of the third diffraction grating 20 relative to the second diffraction grating 18. Here, an axial direction refers to a direction normal to a main surfaces of the second diffraction grating 18 and the third diffraction grating 20.

FIG. 2B illustrates the light path L4 formed by the second diffraction grating 18, and FIG. 2C illustrates the light path L5 formed by the third diffraction grating 20. Here, the light path L4 shown in FIG. 2B is a path of the first $0^{th}$ order beam which propagates straight after passing through the first diffraction grating 16, the second $\pm n^{th}$ order beam (which is the second $1^{st}$ order beam in the first embodiment) passed through the second diffraction grating 18, and the third $0^{th}$ order beam whose propagation direction remains unchanged after passing through the third diffraction grating 20 (the first $0^{th}$ order beam→the second $1^{st}$ order beam→the third $0^{th}$ order beam). The light path L5 shown in FIG. 2C is a path of the first $0^{th}$ order beam and the second $0^{th}$ order beam which propagate straight after passing through the first diffraction grating 16 and the second diffraction grating 18, and the diffracted beam 34 (i.e., the third $1^{st}$ order beam) which propagates in the same direction as the diffracted beam 32 shown in FIG. 2B after being diffracted by the third diffraction grating 20 (the first $0^{th}$ order beam→the second $0^{th}$ order beam→the third $1^{st}$ order beam). FIG. 2D illustrates an overlapping of the light paths L4 and L5. In accordance with the present invention, the displacement is measured by measuring the intensity of the interference beam 36 before and after the movement of the third diffraction grating 20 relative to the second diffraction grating 18. Further, as shown in FIG. 2E, the present invention utilizes characteristics that the light paths L4 and L5 share the same light path and the diffracted beams are hardly affected by an inclination of the diffraction gratings. In accordance with the present invention, the interference pattern is not adversely affected even when the third diffraction grating 20 vibrates due to, for example, tilting or external vibration. In addition, since the present invention does not require a splitter which is one of the largest element in the conventional optical system, the apparatus of the present invention can be miniaturized at a lower cost.

Figure 3:
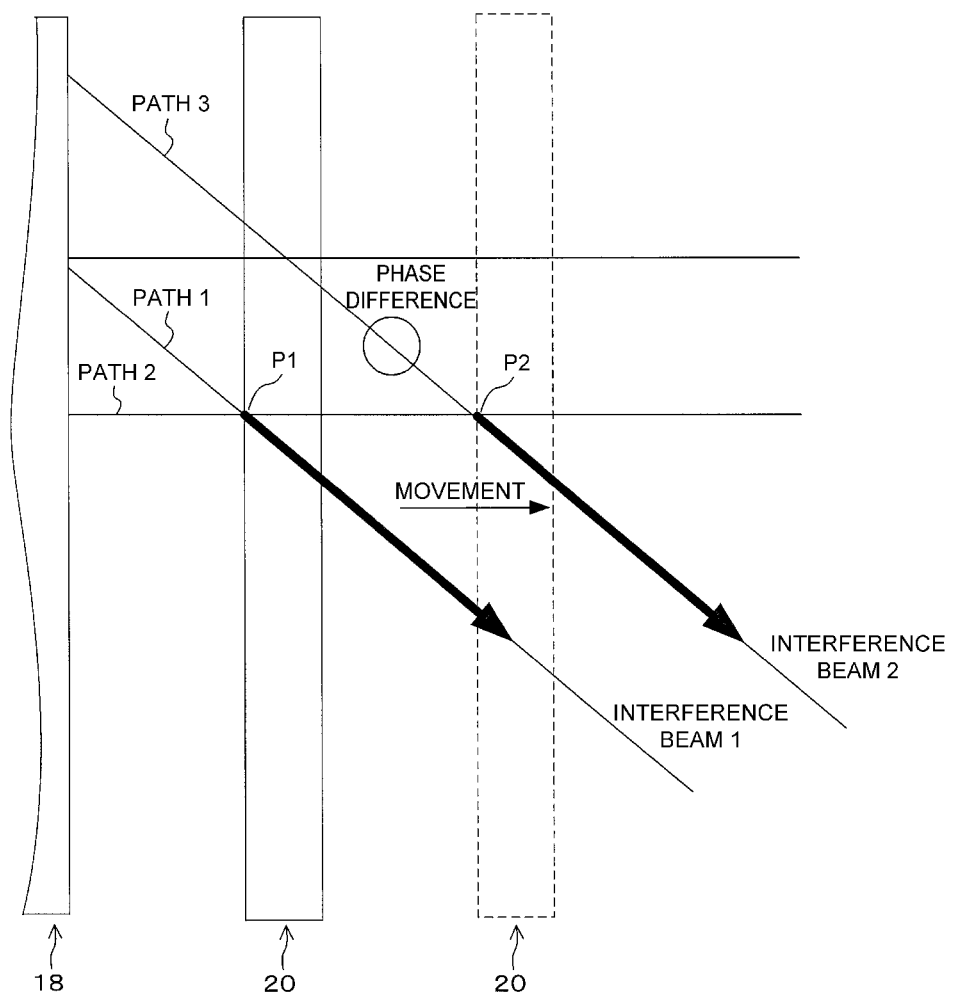
FIG. 3 is a diagram qualitatively illustrating an operation principle of a displacement measurement by the wire extension detection unit.

Next, an operation principle of the wire extension detection unit will be qualitatively described with reference to FIG. 3. First, the second diffraction grating 18 and the third diffraction grating 20 are disposed to face each other at a predetermined interval. The laser light source 12 emits a laser light, which passes through the collimating lens 14 to be converted to the parallel beam 15. Thereafter, the parallel beam 15 passes through the first diffraction grating 16. The straight beam 30, which is a portion of the parallel beam 15 propagating straight after passing through the first diffraction grating 16, is incident upon the second diffraction grating 18. The straight beam 30 is then divided into a diffracted beam (path 1 and path 3) and a straight beam (the straight beam 30 shown in FIG. 2A) by the second diffraction grating 18. Thereafter, the diffracted beam and the straight beam are incident upon the third diffraction grating 20. The straight beam is then diffracted by the third diffraction grating 20 (path 2). The interference beam is generated by the interference between the diffracted beam diffracted by the fixed first diffraction grating 18 and the diffracted beam diffracted by the movable second diffraction grating 20. Thereafter, the optical sensor 26 detects the intensity of the interference beam. When the third diffraction grating 20 moves in the axial direction from a position P1 denoted by a solid line to a position P2 denoted by a dotted line in FIG. 3, a position on the optical axis at which the beam propagating along the path 2 is diffracted is changed from the position P1 to the position P2. An interference beam 1 without phase difference is generated by the interference between the diffracted beams of the paths 1 and 2 before the movement of the third diffraction grating 20. However, an interference beam 2 with a phase difference shown in FIG. 3 is generated by the interference between the diffracted beams of the paths 2 and 3 after the movement of the third diffraction grating 20. As a result, the interference pattern corresponding to an amount of the movement, in which bright portion and dark portion are alternately repeated, is generated, and the amount of movement can be detected.

Figure 4A:
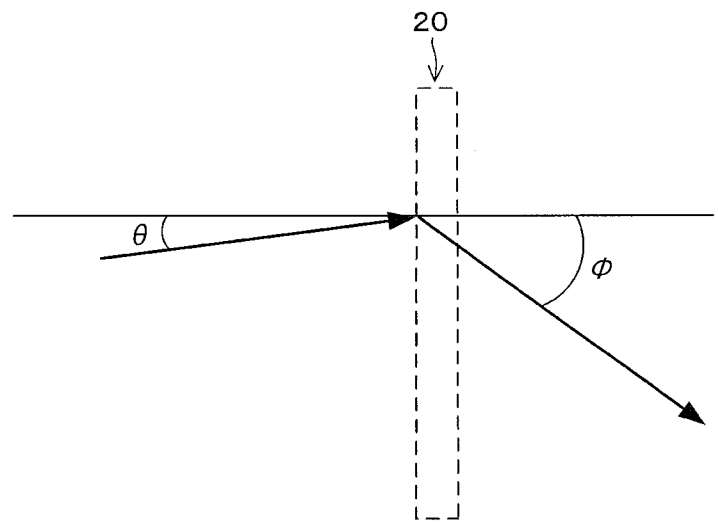
FIGS. 4A and 4B are diagrams quantitatively illustrating the operation principle of the displacement measurement by the wire extension detection unit.

Next, an operation principle of the wire extension detection unit will be quantitatively described with reference to FIGS. 4A and 4B. As shown in FIG. 4A, a relationship between an incidence angle θ (=0° when a parallel beam is incident upon the third diffraction grating 20) of a transmissive diffraction grating (the third diffraction grating 20 in FIGS. 4A and 4B) and a diffraction angle φ is given by Equation 1, where λ is a wavelength and P is a diffraction grating pitch:

$$\sin \phi + \sin \theta = \lambda/P \tag{1}$$

Figure 4B:
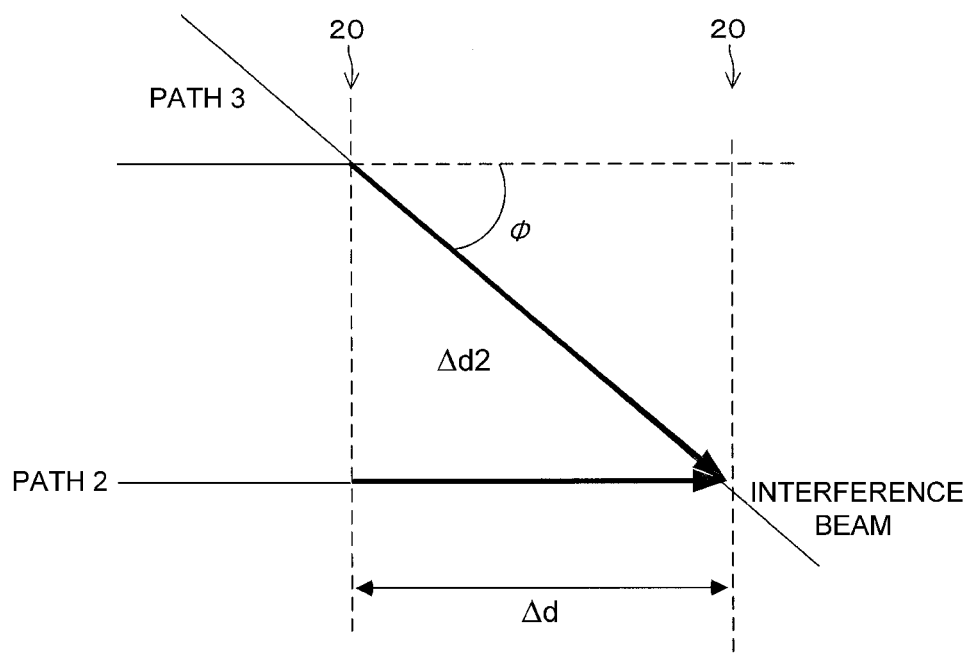

As shown in FIG. 4B, when the third diffraction grating 20 moves by Δd, a variation in length of the path 2 is Δd, and a variation Δd2 in length of the path 3 is given by Equation 2.

$$\Delta d2 = \Delta d/\cos \phi \tag{2}$$

If there is no path difference between the variable path 2 and the fixed path 1 before the movement, a path difference Δ between the path 2 and the path 3 after the movement is given by Equation 3.

$$\Delta = \Delta d2 - \Delta d = \Delta d(1/\cos \phi - 1) \tag{3}$$

A specific example will be described based on the quantitative operation principle hereinafter. Assuming that the incidence angle θ of the transmissive diffraction grating is 0, the wavelength λ is 0.65 μm, and the grating pitch P is 1.6 μm, the diffraction angle φ is arc sin(0.65/1.6)=24.0° from Equation 1. In addition, since the diffraction angle φ is 24° for the diffraction grating, the path difference Δ between the paths 2 and 3 when the amount of movement of the third diffraction grating 20 is Δd can be calculated as Δ=Δd(1/cos(24°)−1)= 0.094 Δd by Equation 3, and a single interference fringe is generated by the amount of movement of about 11 wavelengths.

In the conventional interference system, the interference fringe always occurs twice when the amount of movement is equal to one wavelength. However, in the first embodiment, the occurrence frequency of the interference pattern is dependent upon the diffraction angle φ, and a detection range may be increased by adjusting the diffraction angle φ. In addition, since the diffraction angle φ is determined by the grating pitch P and the wavelength λ, the occurrence frequency of the interference pattern is dependent upon the grating pitch P. Therefore, by reducing (narrowing) the grating pitches P of the second diffraction grating 18 and the third diffraction grating 20, the displacement may be measured in order of less than one wavelength. By increasing the detection range in this manner, the displacement in a linear range can be measured, and the displacement widely ranging from sub-μm to about 20 mm can be measured.

Table 1 shows an exemplary relationship among the number of gratings (number/mm), the grating pitch P (μm), the diffraction angle φ (degrees), a magnification G and a detection range (μm) in the second diffraction grating 18 and third diffraction grating 20. Assuming that the path difference between the paths 2 and 3 is Δ when the third diffraction grating 20 moves by Δd, Δ is obtained by Equation 3 above. The magnification G is Δd/Δ. When G is 1, the detection range is equal to one wavelength of light, and the detected intensity has a sinusoidal waveform. When the magnification G is greater than 1, the detection range is [wavelength λ]×[magnification G], and the displacement can be measured within the linear range by expanding the sine wave.

TABLE 1

|  | μm Sensor | | | | mm Sensor |
| --- | --- | --- | --- | --- | --- |
| Gratings (numbers/mm) | 1350 | 625 | 300 | 20.511 | 10 |
| Grating pitch P (μm) | 0.74 | 1.60 | 3.33 | 48.75 | 100.00 |
| Diffraction angle Φ (°) | 61.34224 | 23.96948 | 11.24472 | 0.763898 | 0.372425 |
| Magnification G | 0.921513 | 10.59581 | 51.09213 | 11250.5 | 47335.78 |
| detection range (μm) | 0.299492 | 3.443639 | 16.60494 | 3656.412 | 15384.13 |

Hereinafter, a wire movement detection unit according to the first embodiment will be described with reference to FIGS. 5 and 6A through 6D. First, the configuration and the qualitative operation principle of the wire movement detection unit will be described with reference to FIG. 5. The wire movement detection unit includes the laser light source 12, the collimating lens 14, the first diffraction grating 16, the semi-reflective mirror 22, the total reflection mirror 24 and the first optical sensor 28. The first diffraction grating 16 is disposed in the optical axis of the parallel beam 15, and divides an incident beam into a straight $0^{th}$ order beam (a beam of $0^{th}$ order) and $\pm n^{th}$ order beams (diffracted beams of $\pm n^{th}$ order) having diffraction angles with respect to the $0^{th}$ order beam. The semi-reflective mirror 22, which is disposed between the second diffraction grating 18 and the third diffraction grating 20 in the optical axis of the straight beam 30, is installed to face the first diffraction grating 16. The semi-reflective mirror 22 reflects a portion of the straight beam (light path L1) passed through the first diffraction grating 16 so that the straight beam is divided into a first beam (referred to as a first reflected beam Lrev1) traveling along a light path L2 to return to the first diffraction grating 16 and a second beam propagating straight along a light path L3.

The total reflection mirror 24 is disposed to be movable relative to the semi-reflective mirror 22 along the optical axis. The total reflection mirror 24 reflects the straight beam 30 (in the light path L3) passed through the semi-reflective mirror 22 to generate a second reflected beam Lrev2. The second reflected beam Lrev2 passes through the semi-reflective mirror 22, and then returns to the first diffraction grating 16. In addition, in the first embodiment, the second diffraction grating 18 and the third diffraction grating 20 are disposed between the first diffraction grating 16 and the semi-reflective mirror 22. Thus, light propagating along the light path L1 shown in FIG. 5 includes a first $0^{th}$ order beam passed through the first diffraction grating 16, a second $0^{th}$ order beam passed through the second diffraction grating 18 and a third $0^{th}$ order beam passed through the third diffraction grating 20. Similarly, the first reflected beam Lrev1 (in the light path L2) and the second reflected beam Lrev2 include a first $0^{th}$ order beam passed through the third diffraction grating 20 and a second $0^{th}$ order beam passed through the second diffraction grating 18. The first reflected beam Lrev1 and the second reflected beam Lrev2 are diffracted by the first diffraction grating 16, and the optical sensor 28 receives diffracted beams of the first reflected beam Lrev1 and the second reflected beam Lrev2 to detect the intensity of the diffracted beams. A signal representing an interference pattern of the interference beam such as "bright" and "dark" is generated in response to the detected intensity by reception of the interference beam. An axial displacement of the total reflection mirror 24 (displacement Y shown in FIG. 5A) with respect to the semi-reflective mirror 22 is measured from the signal representing the interference pattern corresponding to an amount of movement. A photodiode may be used as the optical sensor 28. Although the wire movement detection unit according to the first embodiment is configured in a manner that the optical sensor 28 receives a $1^{st}$ order beam diffracted by the first diffraction grating 16, a diffracted beam of a predetermined order other than 1 may also be used to detect the displacement Y similar to the wire extension detection unit.

Hereinafter, the operation principle of the wire movement detection unit will be quantitatively described with reference to FIGS. 6A through 6D. FIG. 6A illustrates an operation of the wire movement detection unit, and FIGS. 6B through 6D show images of interference patterns detected by the optical sensor 28. Specifically, FIG. 6A illustrates an example where all of the elements, except for the total reflection mirror 24, of the apparatus 10 for measuring displacement in accordance with the first embodiment are made into a single body as the displacement measuring unit 70 movable relative to the total reflection minor 24. As shown in FIG. 6A, when the displacement of the total reflection minor 24 relative to the semi-reflective minor 22 (or the displacement of the displacement measuring unit 70 relative to the total reflection minor 24) is Y, a path difference between the first reflected beam Lrev1 and the second reflected beam Lrev2 is 2Y. If an optical brightness detected by the optical sensor 28 before the movement is "bright" (the inside of a frame F1 in FIG. 6B), and an oscillation wavelength of the laser light source 12 is λ, the brightness detected by the optical sensor 28 changes from "bright" to "dark" (the inside of a frame F3 in FIG. 6D) when Y=λ/4×(2n+1), where n is an integer. When 0<Y<λ/4×(2n+1), which corresponds to a transient state from "bright" to "dark", the brightness detected by the optical sensor 28 is in intermediate level (the inside of a frame F2 in FIG. 6C). Further, when the light intensity throughout the whole range shown in FIGS. 6B through 6D is detected, a detection sensitivity deteriorates because the light intensity changes only in a small amount in response to a change in the interference pattern. In order to prevent this, the light intensity is measured only within a part of the range indicated by the frames F1 through F3 in FIGS. 6B through 6D, respectively, thereby achieving a high detection sensitivity in accordance with first embodiment.

Figure 9C:
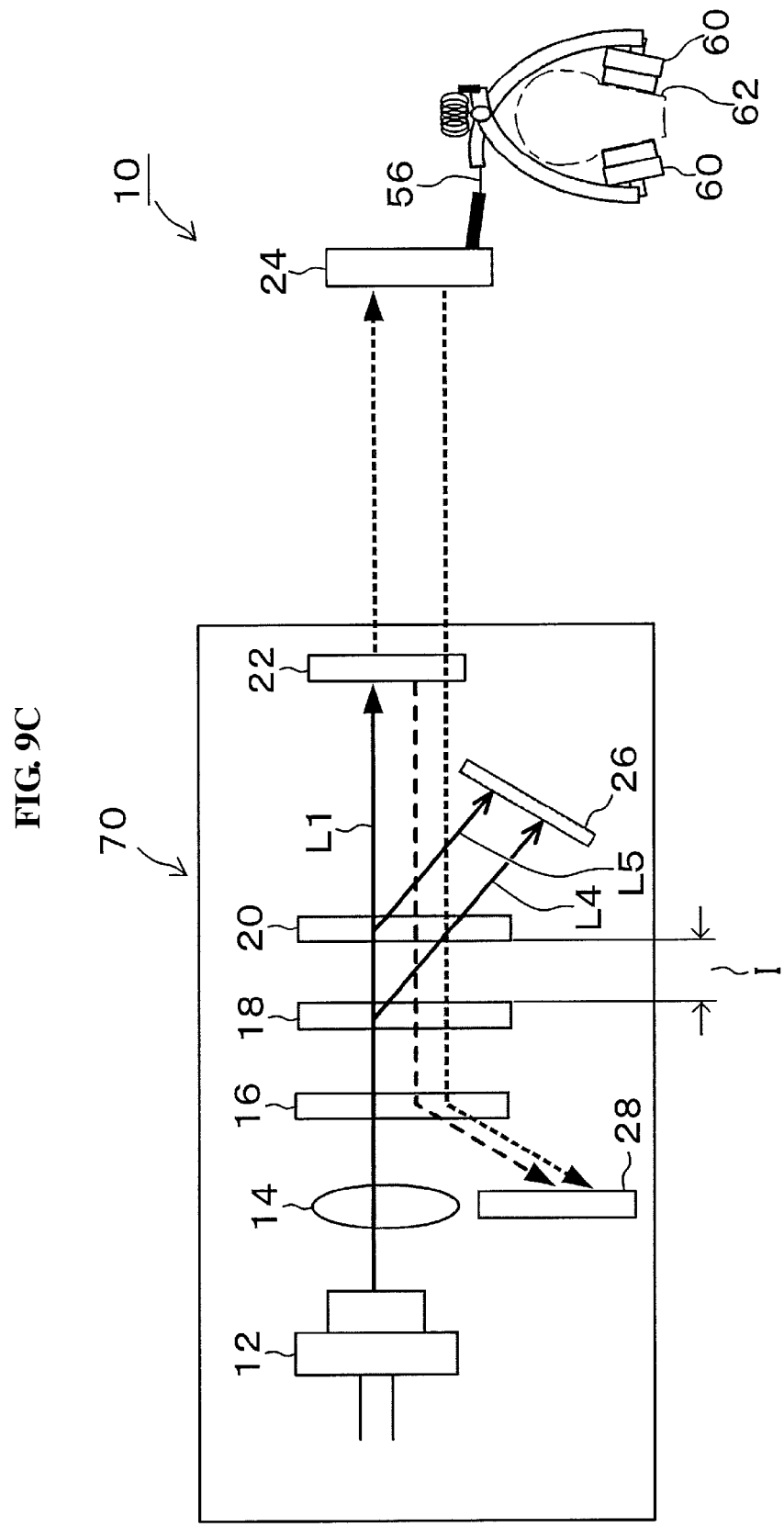
Figure 11A:
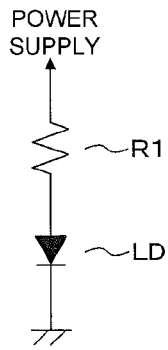
FIG. 11A is a circuit diagram of a laser light source in the wire extension detection unit of the above example.
Figure 11B:
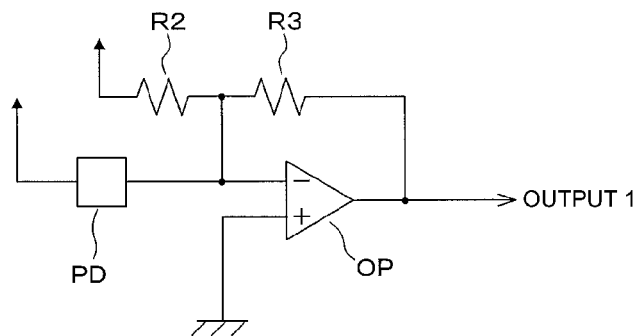
FIG. 11B is a circuit diagram of an optical detection circuit in the wire extension detection unit.
Figure 11C:
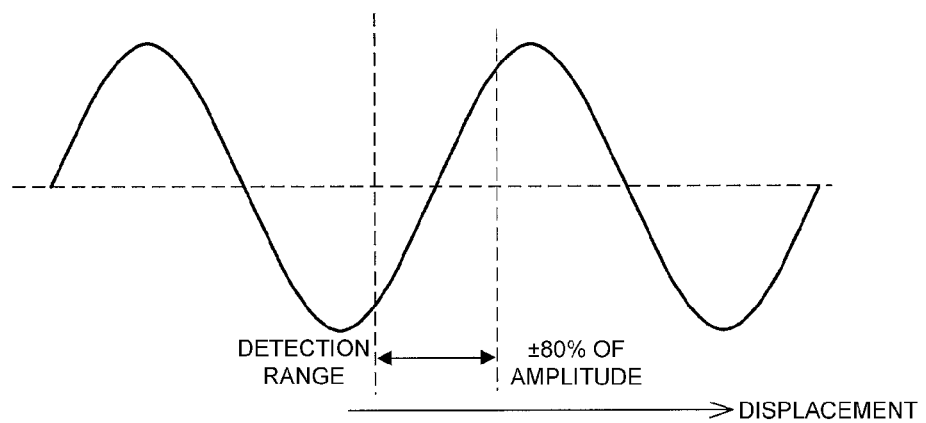
FIG. 11C is a signal waveform diagram of an output 1 of the optical detection circuit.
Figure 11D:
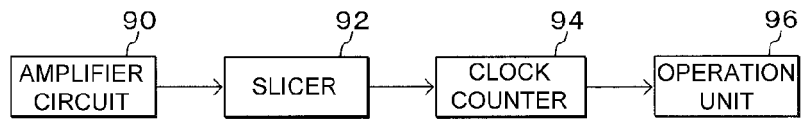
FIG. 11D is a block diagram schematically illustrating a process sequence of the output 1.
Figure 12A:
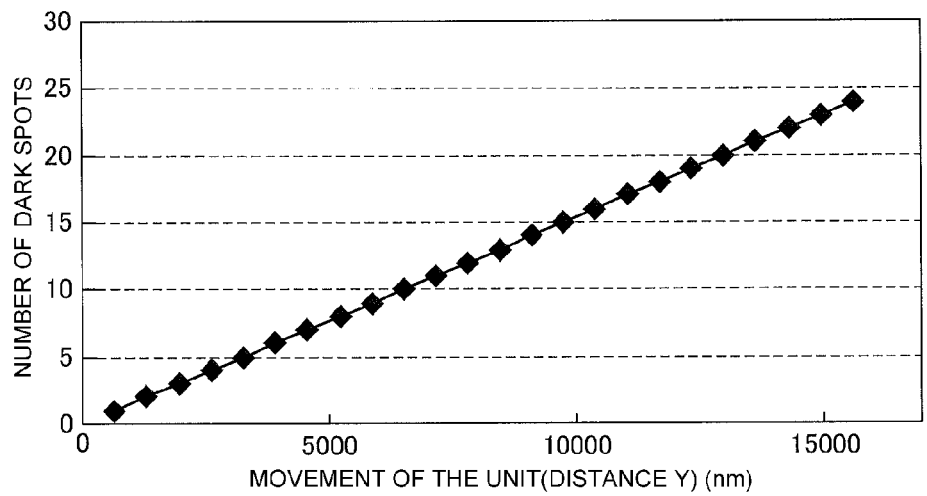
FIG. 12A illustrates a transition of dark spots detected by an optical sensor during an idle period in the wire movement detection unit of the above example.
Figure 12B:
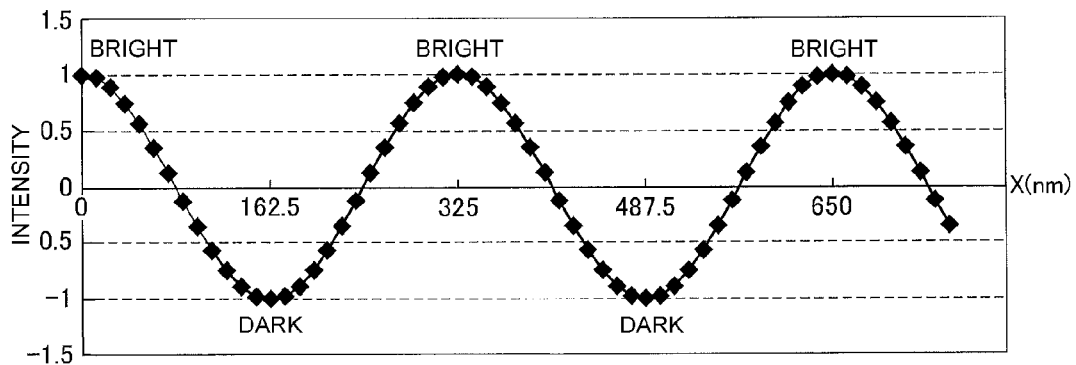
FIG. 12B illustrates a transition of light intensity measured during a mechanical braking period by the optical sensor in the wire extension detection unit.
Figure 13A:
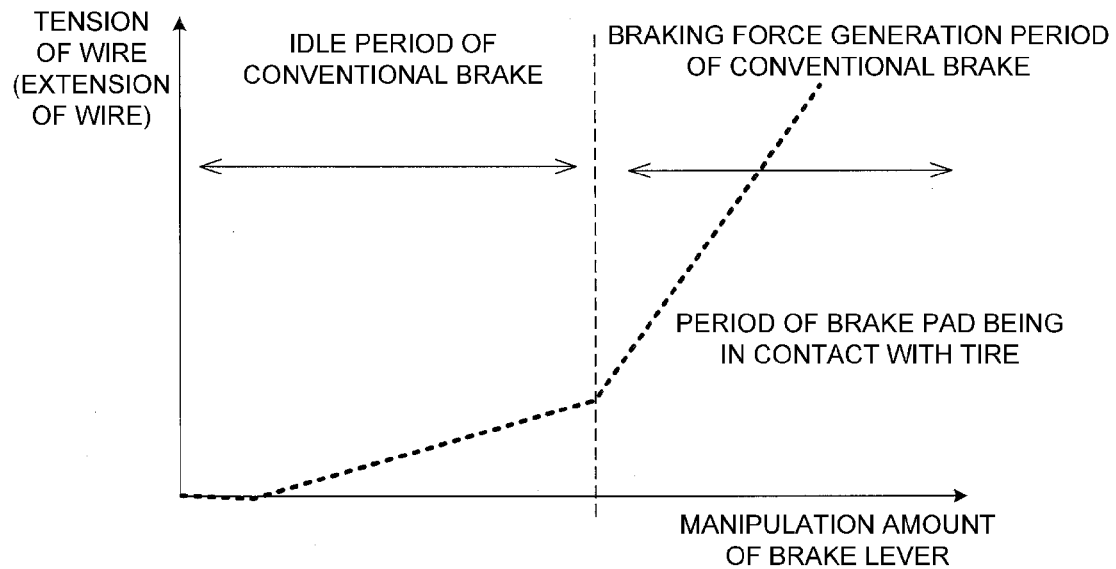
FIG. 13A illustrates a relationship between an amount of manipulation of a brake lever and a wire tension.
Figure 13B:
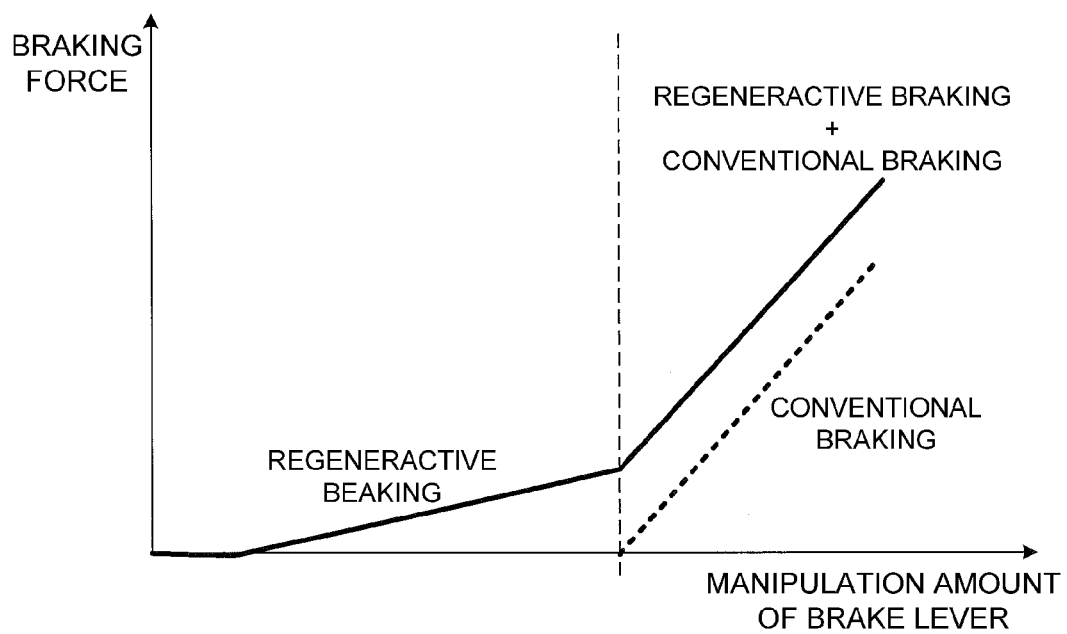
FIG. 13B illustrates a relationship between the amount of manipulation and a braking force.

Next, a specific example of the first embodiment will be described with reference to FIGS. 9A to 13B. FIGS. 9A through 9C illustrate braking operations of the electric power-assisted bicycle and functions of the apparatus for measuring displacement, and FIG. 10 illustrates a specific example of the displacement measuring unit according to the first embodiment. FIG. 11A is a circuit diagram of a laser light source of the specific example, FIG. 11B is a circuit diagram of an optical detection circuit of the wire extension detection unit, FIG. 11C is a signal waveform diagram of an output 1 of the optical detection circuit, and FIG. 11D is a schematic block diagram showing the processing sequence of the output 1. FIG. 12A illustrates a transition of dark spots detected by the optical sensor 28 in the wire movement detection unit during an idle period in accordance with the specific example, and FIG. 12B illustrates a transition of light intensity measured by the optical sensor 26 in the wire extension detection unit during a mechanical braking period. FIG. 13A illustrates a relationship between an amount of manipulation of the brake lever and the wire tension, and FIG. 13B illustrates a relationship between the amount of manipulation and the braking force. In addition, the electric power-assisted bicycle 50 and the brake mechanism therein are constituted as described above.

The displacement measuring unit 70, which is movable with the brake wire 56 by means of a guide shaft (not shown) for example, is installed near the brake lever 54 in a housing 11 fixed to the brake handle (bicycle handle) 52. In addition, the total reflection mirror 24 is fixed on a surface of a side 11B of the housing 11. The brake wire 56 penetrates from a side 11A of the housing 11 to the side 11B. As shown in FIG. 10, the displacement measuring unit 70 is constituted by the laser light source 12, the collimating lens 14, the first through third diffraction gratings 16, 18 and 20, the semi-reflective mirror 22 and the optical sensors 26 and 28 accommodated in a transparent resin molded body 72. A through-hole 74 extending from a side 72A to a side 72B for passing through the brake wire 56 is disposed in an upper portion of the transparent resin molded body 72. The brake wire 56 is fixed to the transparent resin molded body 72 at two points by means of screws 76A and 76B.

Furthermore, the laser light source 12 is inserted in a circular recessed portion (not shown) formed at the side 72A, and is connected to a laser driver circuit 78 installed outside of the transparent resin molded body 72. In addition, the collimating lens 14 is disposed in a space 80A in the transparent resin molded body 72, and an outer edge of the collimating lens 14 is fixed by an adhesive for example. The space 80A may be formed by cutting. Further, the first diffraction grating 16 is disposed in a space 80B, and the second diffraction grating 18 and third diffraction grating 20 are disposed in a space 80C. Rear surfaces of the first through third diffraction gratings 16, 18, and 20 are fixed by a transparent adhesive for example. Furthermore, the semi-reflective mirror 22 is disposed in a space 80D, the optical sensor 26 is disposed in a space 80E, and the optical sensor 28 is disposed in a space 80F.

The transparent resin molded body 72 further has a spaces (not shown) serving as a light path, a slit 86A located above the second diffraction grating 18 and a slit 86B located above the third diffraction grating 20. The slit 86A extends from the space 80C. The slit 86A and the slit 86B provide elasticity for the transparent resin molded body 72 such that the transparent resin molded body 72 can expand and contract (denoted by an arrow F10 in FIG. 10) along with the brake wire 56 in the axial direction near a boundary between the second diffraction grating 18 and the third diffraction grating 20. In the first embodiment, the third diffraction grating 20 is movable horizontally relative to the second diffraction grating 18 by the slit 86A and the slit 86B. Thus, the amount of movement can be measured precisely. In addition, the transparent resin molded body 72 is not bendable in a direction of thickness. The optical sensor 26 and the optical sensor 28 are connected to an I/V conversion circuit 82 and an I/V conversion circuit 84, respectively, installed outside of the transparent resin molded body 72.

A transparent resin such as acryl and polycarbonate having a dimension of 15 mm (W) by 5 mm (H) may be used as the transparent resin molded body 72. Further, a laser diode (LD) having a small emergence angle, a wavelength of 650 nm and an output of 5 mW may be used as the laser light source 12. The optical axis may be arranged in a direction parallel to the grooves 18A and 20A in the diffraction grating 18 and the diffraction grating 20. A collimating lens having a numerical aperture (NA) of 0.65, an effective diameter of 4 mm and a thickness of 1.5 mm may be used as the collimating lens 14. A diffraction grating having a grating pitch of 0.72 nm and a grating groove depth of 216 nm may be used as the first diffraction grating 16. In addition, a diffraction grating having a grating pitch P of 1.6 nm, a groove depth of 150 nm, and a groove width of 0.5 nm may be used as the second diffraction grating 18 and the third diffraction grating 20.

Preferably, the diffraction angle of the second diffraction grating 18 is same as that of the third diffraction grating 20, and a distance between the diffraction grating 18 and the diffraction grating 20 is within a coherence length (about 1 mm) of the laser light source 12. This is because an interference characteristics deteriorates and a larger diameter of an incident beam is required when the distance between the diffraction grating 18 and the diffraction grating 20 increases. In addition, a mirror having 50% transmittance and 50% reflectivity is preferable as the semi-reflective mirror 22, and a mirror having 100% reflectivity is preferable as the total reflection mirror 24. An optical sensor having a size suitable for receiving at least a portion of the interference beam 36 is preferable as the optical sensor 26 serving as a light receiving device, and an optical sensor having a size suitable for receiving at least a portion of the interference beam of the first reflected beam Lrev1 and the second reflected beam Lrev2 are preferable as the optical sensor 28.

To detect the extension of the brake wire 56, the displacement measuring unit 70 is configured as in the following. The transparent resin molded body 72 can be divided into two parts by a boundary line (denoted by a dotted line in FIG. 10) between the second diffraction grating 18 and the third diffraction grating 20. The two divided parts are fixed to the brake wire 56 by the screws 76A and 76B, respectively, and are elastically connected to each other about the slit 86A and the slit 86B. As shown in FIG. 9C, when the brake wire 56 is extended, an interval I varies in response to the extension of the brake wire 56 with the two diffraction gratings 18 and 20 remaining parallel to each other. Thus, the amount of extension (the displacement X) can be detected. Further, as shown in FIG. 9B, the displacement measuring unit 70 moves along with the brake wire 56, and a change occurs in the distance between the total reflection mirror 24 and the semi-reflective mirror 22 when compared to a state before the start of the manipulation of the brake lever shown in FIG. 9A. Thus, the amount of movement (the displacement Y) of the brake wire 56 can be detected.

FIG. 11A illustrates a circuit configuration of the laser light source 12. In the present example, a laser diode LD is used in the laser light source 12. The laser diode LD is connected to a power supply via a current limiting resistor R1. In addition, FIG. 11B illustrates the optical detection circuit in the wire extension detection unit according to the example. In the example, a photodiode PD is used in the optical sensor 26. The photodiode PD generates a current according to the intensity of the received interference beam. The generated current is inputted to an inverting input terminal of an operational amplifier OP to be converted into a voltage, and the voltage is outputted as the output 1. That is, the operational amplifier OP is equivalent to the I/V converter circuit 82. In addition, two resistors R2 and R3 are installed in the circuit shown in FIG. 11B. The resistor R2 sets an operation point (an output voltage when there is no incident beam upon the photodiode PD) of the output of the operational amplifier OP. The resistor R3 whose terminals are both connected to the operational amplifier OP sets a gain of the output voltage in response to the intensity of the incident beam of the optical sensor 26 (the photodiode PD). If the light intensity remains constant, the output voltage increases as the resistance of the resistor R3 increases.

FIG. 11C illustrates a waveform of the output 1 produced by the operational amplifier OP. In FIG. 11C, the abscissa represents the displacement X, and the ordinate represents a detected voltage. As shown in FIG. 11C, the displacement X may be obtained from an amplitude of the output 1 having a sine wave shape. Specifically, as shown in FIG. 11D, the output 1 is amplified by an amplifier circuit 90 and then binarized by a slicer 92. Further, clocks are counted by a clock counter 94. Thereafter, an arithmetic unit 96 calculates [the count]×[the wavelength λ] by an arithmetic firmware to obtain the displacement X. An entire range of the amplitude of the sine wave shown in FIG. 11C can be used to obtain the displacement X. However, in order to prepare against a deviation in a detection range caused by a calibration error of the optical sensor 26, it is preferable to have about 20% margin and use a detection range of about ±80% amplitude. The optical detection circuit, the output waveform and the operation process of the optical sensor 28 in the wire movement detection unit are same as those of the optical sensor 26.

In the displacement measuring unit 70 described above, when the pulling of the brake lever 54 starts while in the states shown in FIG. 8A and FIG. 9A, the brake wire 56 moves as shown in FIG. 8B. At the same time, the displacement measuring unit 70 moves together with the brake wire 56 as shown in FIG. 9B, resulting in the displacement Y. By measuring the amount of movement of the brake wire 56 based on the displacement Y which is the amount of movement of the total reflection mirror 24 relative to the semi-reflective mirror 22, the amount of manipulation of the brake lever 54 corresponding to the amount of movement can be measured in order of millimeters. Based on the change in the interval I between the second diffraction grating 18 and third diffraction grating 20 shown in FIG. 9C, the displacement measuring unit 70 measures the extension (the displacement X) of the brake wire 56 caused by the manipulation of the brake lever 54 shown in FIG. 8C in order of micrometers. The displacement measuring unit 70 detects a transition from the idle period to the mechanical braking period of the electric power-assisted bicycle 50. Further, the controller 64 in the electric power-assisted bicycle 50 determines an optimum regenerative braking force based on the output of the displacement measuring unit 70, and controls the motor 66 to perform an optimum regenerative braking control. The motor 66 generates an electric power for charging the battery 68. In addition, the controller 64 detects a performance and conditions of the battery 68.

The electric power-assisted bicycle 50 including the apparatus 10 for measuring displacement can detect a minute deformation of the brake wire 56 caused by a tension. Therefore, the electric power-assisted bicycle 50 can charge the battery 68 by regenerative braking using the motor 66 as a generator during the idle period of the conventional brake shown in FIG. 13A. Further, as shown in FIG. 13B, an efficiency may be enhanced since the regenerative braking is performed in parallel during the mechanical braking period (during which the brake pad is in contact with wheels). According to the first embodiment, even when the operation point of the mechanical braking changes, for example, from the operation point P1 to the operation point P2 in FIG. 16B as a result of the brake adjustment, the changed operation point can be accurately detected. Thus, it is possible to maintain a high regeneration efficiency.

The transition from the idle period to the mechanical braking period is detected as below. During the idle period, only the interference pattern detected by the optical sensor 28 in the wire movement detection unit changes while the interference pattern detected by the optical sensor 26 in the wire extension detection unit remains unchanged. FIG. 12A shows a transition of the number of dark spots detected by the optical sensor 28 during the idle period. In FIG. 12A, the abscissa represents the amount of movement (the displacement Y (nm)) of the displacement measuring unit 70, and the ordinate represents the number of the dark spots. As shown in FIG. 12A, the amount of movement (the displacement Y) can be detected in order of micrometers or millimeters by counting the dark spots detected by the optical sensor 28. During the mechanical braking period, the interference pattern detected by the optical sensor 26 changes. In FIG. 12B, the abscissa represents the amount of movement (the displacement X) of the wire extension detection unit, and the ordinate represents a light intensity. FIG. 12B illustrates a variation in the light intensity measured by the optical sensor 26 during the mechanical braking period. A start of mechanical braking can be detected from the variation in the light intensity shown in FIG. 12B based on the quantitative principle described above.

According to the first embodiment, the following effects can be achieved:

(1) The first diffraction grating 16, the semi-reflective mirror 22 and the total reflection mirror 24 are disposed in order along the optical axis of a parallel straight beam emitted from the laser light source 12. The parallel straight beam incident upon the semi-reflective mirror 22 through the first diffraction grating 16 is divided into the straight beam 30 headed toward the total reflection mirror 24 and the first reflected beam Lrev1 returning to the first diffraction grating 16. The straight beam 30 is reflected by the total reflection mirror 24 as the second reflected beam Lrev2 returning to the first diffraction grating 16 through the semi-reflective mirror 22. The first reflected beam Lrev1 and the second reflected beam Lrev2 are then diffracted by the first diffraction grating 16 and the light intensity of the diffracted beam of a predetermined order is measured by the optical sensor 28. In such manner, the amount of movement (the displacement) of the brake wire 56 can be detected based on the change in the relative position of the total reflection mirror 24 with respect to the semi-reflective mirror 22.

(2) Since the displacement is detected by a light path sharing scheme, an influence of tilt can be suppressed. Thus, a detection error caused by an external force (vibration) can be prevented.

(3) Since a splitter is not required, the number of components can be reduced. Therefore, miniaturization and low-cost fabrication is facilitated. In addition, owing to a simple configuration, the device is highly robust to positional deviation.

(4) The measurement range can be expanded to be greater than one wavelength. Thus, a displacement ranging from less than one wavelength to greater than one wavelength can be continuously measured and an optical resolution can be adjusted by the pitch of the diffraction grating.

(5) The second diffraction grating 18 and the third diffraction grating 20 having the same grating pitch P, which are movable relative to each other along the optical axis, are disposed between the first diffraction grating 16 and the semi-reflective mirror 22. Among the beams diffracted by the second diffraction grating 18 and the third diffraction grating 20, the beam diffracted by the second diffraction grating 18 having a predetermined order is received by the optical sensor 26 by which the light intensity is measured. In addition, based on the signal representing the interference pattern, the displacement corresponding to the amount of axial movement (the displacement X) of the third diffraction grating 20 relative to the second diffraction grating 18 is detected so as to measure the amount of extension of the brake wire 56. Thus, the displacement may be simultaneously or sequentially measured at different positions in the optical axis using a single light source. In the first embodiment, the starting point of mechanical braking can be accurately detected based on the two displacements measured as above. Thus, the efficiency of regenerative charging is enhanced.

Figure 14A:
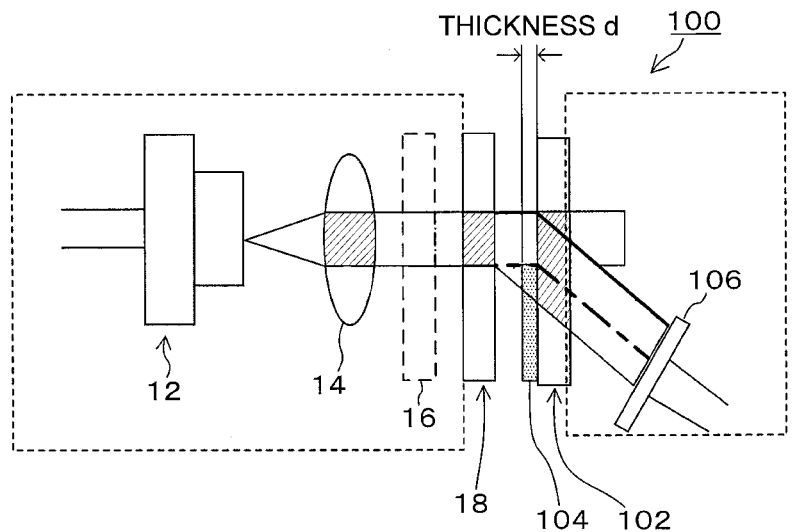
Figure 14B:
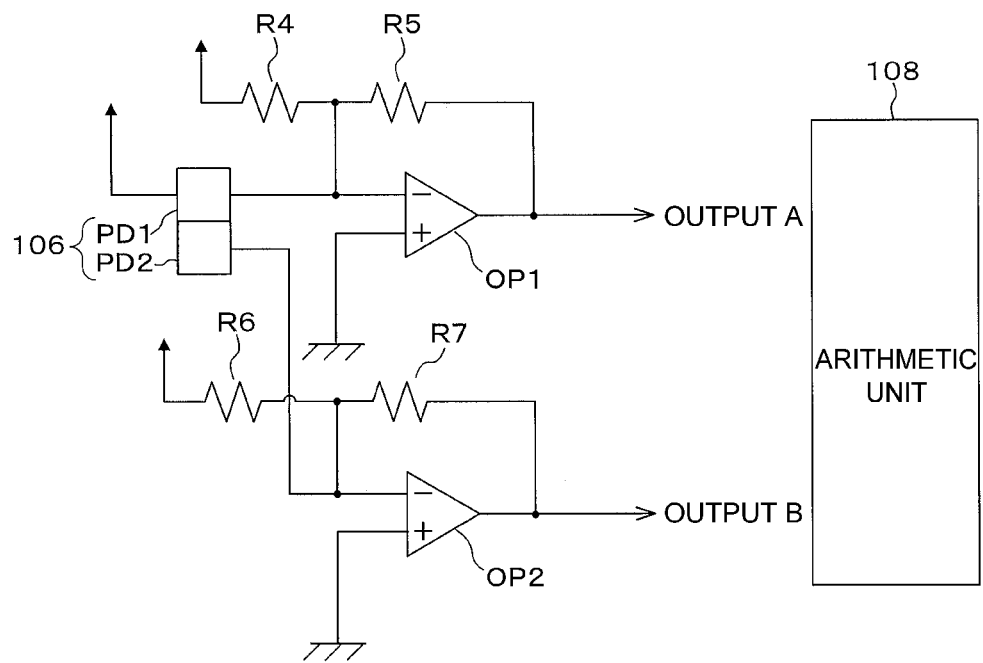

Hereinafter, a second embodiment of the present invention will be described with reference to FIGS. 14A through 15C wherein like reference numerals indicate like elements of the first embodiment. The second embodiment is a modified example of the wire extension detection unit of the first embodiment. FIG. 14A illustrates a basic structure of a wire extension detection unit according to the second embodiment of the present invention, and FIG. 14B is a circuit diagram of an optical detection circuit according to the second embodiment. FIGS. 15A and 15B are signal waveform diagrams depicting outputs A and B produced by the optical detection circuit, and FIG. 15C is a signal waveform diagram depicting a signal waveform obtained from an arithmetic operation between the outputs A and B. In accordance with the second embodiment, a third diffraction grating includes a stepped portion, and one of the two outputs of a dual optical sensor is divided by the other output of the two outputs of the dual optical sensor so that the detection position remains unchanged even when the light intensity of the laser light source changes and that the detection characteristic of the light intensity is linear rather than a sine wave.

As shown in FIG. 14A, the apparatus 10 for measuring displacement has a configuration same as that of the first embodiment except that a phase plate 104 is disposed on a third diffraction grating 102 to form the stepped portion and that a dual optical sensor 106 is used instead of the single optical sensor 26 of the first embodiment. The phase plate 104 has a thickness d of about 3 μm, and is formed by cutting or molding the stepped portion with a material same as that of the third diffraction grating 102. The straight parallel beam which emitted from the laser light source 12 and then collimated by the collimating lens 14 is incident upon the fixed second diffraction grating 18 through the first diffraction grating 16. The beam incident upon the second diffraction grating 18 is divided into a diffracted beam and a straight beam, and the straight beam is then incident upon the movable third diffraction grating 102. A portion of the straight beam directly incident upon onto the third diffraction grating 102 without passing through the phase plate 104 is diffracted at a surface of the third diffraction grating 102 (indicated by a thick solid line in FIG. 14A). A portion of the straight beam incident upon the phase plate 104 passes through the phase plate 104 and is diffracted at the surface of the third diffraction grating 102 (indicated by a dot and dash line in FIG. 14A). In the second embodiment, the dual optical sensor includes two photodiodes PD1 and PD2.

In a two-phase shift scheme, two interference patterns with a path difference of $\Delta=\lambda/4 \times (1/\cos \phi -1)$ are generated, and the generated interference patterns are interpreted by a mathematical operation to obtain a displacement. In this case, the thickness d of the stepped portion is given by the following Equation 4:

$$d=\{\lambda(1/\cos \phi -1)\} \times \{(n-1)/4\}, \qquad (4)$$

where n is a refractive index of the material of the stepped portion.

By substituting, for example, the wavelength $\lambda$ with 0.65 μm and the refractive index n with 1.58, the thickness d of the stepped portion is $d=\{\lambda/(1/\cos \phi -1)\}/\{n-1)/4\}=\{10.65/0.094\}/\{(1.58-1)/4\}=2.98$ (μm).

The beam is incident upon the dual optical sensor 106 after passing through the phase plate 104 having a thickness d obtained from Equation 4 above and also the third diffraction grating 102. Thereafter, as shown in FIG. 14B, a current is generated in response to the intensity of the interference beam received by the photodiode PD1 in the dual optical sensor 106. The generated current is inputted to an inverting input terminal of the operational amplifier OP1 to be converted into a voltage. The voltage is outputted by the operational amplifier OP1 as the output signal A. As shown in FIG. 15A, the output signal A has a sinusoidal waveform. In addition, when the photodiode PD2 receives the interference beam, a current is generated in response to the intensity of the received interference beam. The generated current is inputted to the inverting input terminal of the operational amplifier OP2 to be converted into a voltage. The voltage is outputted as an output signal B. The output signal B has a sinusoidal waveform whose phase is shifted by 90° compared to the output signal A, i.e., a cosine waveform shown in FIG. 15B. That is, the output signal A is sin(X) and the output signal B is cos(X) for the displacement X. Functions of resistors R4 to R7 shown in FIG. 14B are the same as those of the resistors R2 and R3 in the first embodiment.

The output signal A divided by the output signal B is equal to tan(X). Therefore, the displacement X is obtained by calculating arc tan (denoted as $\tan^{-1}$) of the division as expressed by the Equation 5:

$$X=\tan^{-1}(A/B) \qquad (5)$$

The output signals A and B are inputted to an arithmetic unit 108 shown in FIG. 14B. The arithmetic unit 108 performs the above calculation by subjecting the output signals A and B to an analog-to-digital conversion and a digital signal processing. A result of the calculation is shown in FIG. 15C. Similar to the first embodiment, it is preferable to use a detection range of about ±80% of the amplitude. According to the second embodiment, the phase plate 104 having the thickness d is disposed on the movable third diffraction grating 102, and the interference beam is received by the dual optical sensor 106. Thus, the detection characteristic can be linearized by using a phase shift.

In addition, the present invention is not limited to the foregoing embodiments, and various changes may be made therein without departing from the scope of the invention.
(1) The shapes, dimensions, and materials described in the above embodiments are mere examples, and may be changed appropriately as required as long as the same effects are achieved. In the displacement measuring unit 70 of the second embodiment, the transparent resin molded body 72 is provided with elasticity by the slit 86A near the second diffraction grating 18 and the slit 86B near the third diffraction grating 20. However, this is merely an example, and the design may be changed appropriately within a scope where the same effects are achieved. The transparent resin molded body 72 may also be provided with elasticity by installing a slit (not shown) near a middle portion between the two diffraction gratings 18 and 20, for example.

(2) In the first embodiment, the displacement is measured by using the $0^{th}$ order beams and the $1^{st}$ order beams. However, this is merely an example and the displacement may also be measured using diffracted beams of a certain order (e.g., second-order beams) instead of the $1^{st}$ order beam.

(3) In the above-described embodiments, the laser light source 12 is employed as a light source. However, this is merely an example and a low cost light emitting diode (low coherence) may also be used. When a low cost light source other than a semiconductor laser whose coherence length is about 1 mm such as a light emitting diode whose coherence length is about 10 nm or less is used, it is preferable to set a diffraction angle φ shown in FIGS. 4A and 4B smaller. The path difference shown in FIG. 4B is given by Equation 3. Therefore, in a configuration of a sensor with detection range of 3.6 mm for example, the path difference Δ is 0.36 nm when Δd is 3.6 mm and the diffraction angle φ is 0.76°. That is, since the path difference between two interfering beams is less than the minimum distance of 10 μm for interference (spatial coherence length), the path difference falls within a measurable limit, and can be measured. In addition, as described above, the diffraction angle φ can be changed by changing the grating pitch P.

(4) In accordance with the first embodiment, the braking force is detected by measuring the displacement made by the extension (tension) of the brake wire in the electric power-assisted bicycle 50. However, this is merely an example. The displacement measuring unit 70 may be inserted in the tube 58 holding the brake wire 56, and the braking force may be detected based on a stress applied to the displacement measuring unit 70 in a lengthwise direction of the brake wire 56.

(5) The first embodiment includes two displacement detection units: the wire movement detection unit including the first diffraction grating 16, the semi-reflective mirror 22, the total reflection mirror 24 and the optical sensor 28; and the wire extension detection unit including the second diffraction grating 18, the third diffraction grating 20 and the optical sensor 26. However, the second displacement detection unit may be provided only when necessary.

(6) In accordance with the first embodiment, both of the amount of extension and the amount of movement of the brake wire 56 are detected to perform a regenerative braking of the electric power-assisted bicycle 50 efficiently. However, this is merely an example. The present invention may also be applied to a measurement of a minute displacement such as measurement of distortions in a mechanical system and a calibration of a micro-measurement instrument. For instance, detection of positions required for zooming or focusing of a camera are currently performed by a mechanical switch array. However, the present invention may also be applied thereto to enable flexible and small-sized position detecting devices. In addition, since the present invention can expand the detection range, a displacement greater than one wavelength can be detected linearly. Therefore, the present invention can also be applied to optical microphones for example. Further, a minute vibration can be detected according to the present invention, which can also be applied to vibration sensors for example.

According to the first aspect of the present invention, the relative displacement of the total reflection mirror about the optical axis of the parallel beam widely ranging from sub-μm to about 20 mm can be measured. Thus, an apparatus for measuring displacement capable of measuring minute displacement can be provided. Particularly, since the displacement can be precisely measured without compensating for changes in temperature or environment, distortion or torsion of a mechanical system can be measured. Further, it is preferable that the present invention is used to detect the amount of movement or the amount of extension of the brake wire in the electric power-assisted bicycle.

In addition, by combining the second aspect of the present invention to the first aspect of the present invention, the displacement of the total reflection mirror about the optical axis of the parallel beam can be measured. Further, the displacement between a pair of the diffraction gratings can be measured simultaneously or sequentially by using a single light source, and measuring positions and detection sensitivities can be changed from those of the above-described displacement measurement of the total reflection mirror. Therefore, the present invention is preferably applied to measuring multiple displacements such as the amount of extension and the amount of movement of the brake wire in the electric power-assisted bicycle.

| List of reference signs: | |
| --- | --- |
| 10: apparatus for measuring displacement | 11: housing |
| 11A, 11B: side | 12: laser light source |
| 13: convert laser light | 14: collimating lens |
| 15: parallel beam | 16: first diffraction grating |
| 18: second diffraction grating | 18A: grooves |
| 20: third diffraction grating | 22: semi-reflective mirror |
| 24: total reflection mirror | 26, 28: optical sensor |
| 30: straight beam | 32, 34: diffracted beam |
| 36: interference beam | 50: electric power-assisted bicycle |
| 52: brake handle (bicycle handle) | 54: brake lever |
| 56: brake wire | 58: tube |
| 60: brake pad | 62: rim |
| 64: controller | 66: motor |
| 68: battery | 70: displacement measuring unit |
| 72: transparent resin molded body | 72A, 72B: side |
| 74: through-hole | 76A, 76B: screws |
| 78: laser driver circuit | 80A~80F: space |
| 82, 84: I/V conversion circuit | 86A, 86B: slit |
| 90: amplifier circuit | 92: slicer |
| 94: clock counter | 96: arithmetic unit |
| 102: third diffraction grating | 104: phase plate |
| 106: dual optical sensor | 108: arithmetic unit |
| 200: Michelson interferometer | 202: laser light source |
| 204: collimating lens | 206: splitter |
| 208: fixed mirror | 210: movable mirror |
| 212: optical sensor | 214: fixed unit |
| 216: interference patterns | F1~F3: frame |
| L1~L5: light path | Lrev1, Lrev2: reflected beam |
| LD: laser diode | OP, OP1, OP2: operational amplifier |
| PD, PD1, PD2: photodiode | R1: current limiting resistor |
| R2~R7: resistors | |

What is claimed is:

1. A method for measuring a displacement, the method comprising:

generating a first reflected beam and a transmitted beam from an incidence of a parallel beam upon a first diffraction grating and a semi-reflective mirror in sequence, the first diffraction grating and the semi-reflective mirror being disposed along an optical axis, wherein the first reflected beam is generated by a reflection of the parallel beam by the semi-reflective mirror and the transmitted beam is generated by a transmission of the parallel beam by the semi-reflective mirror;

generating a second reflected beam by a reflection of the transmitted beam by a total reflection mirror movable along the optical axis;

dividing the first reflected beam into a first $0^{th}$ order beam propagating in a direction same as that of the first reflected beam and a first $\pm n^{th}$ order beam having a diffraction angle with respect to the first $0^{th}$ order beam by an incidence of the first reflected beam upon the first diffraction grating;

dividing the second reflected beam into a second $0^{th}$ order beam and a second $\pm n^{th}$ order beam having a diffraction angle with respect to the second $0^{th}$ order beam by an incidence of the second reflected beam upon the first diffraction grating; and measuring a first displacement in a direction of the optical axis from a first light intensity obtained by receiving an interference beam of the first $\pm n^{th}$ order beam and the second $\pm n^{th}$ order beam.

2. The method of claim 1, further comprising:

dividing the parallel beam passed through the first diffraction grating into a third $0^{th}$ order beam and a third $\pm n^{th}$ order beam having a diffraction angle with respect to the third $0^{th}$ order beam by an incidence of the parallel beam passed through the first diffraction grating upon a second diffraction grating disposed between the first diffraction grating and the semi-reflective mirror;

dividing the third $\pm n^{th}$ order beam into a fourth $0^{th}$ order beam and a fourth $\pm n^{th}$ order beam having a diffraction angle with respect to the fourth $0^{th}$ order beam by an incidence of the third $\pm n^{th}$ order beam upon a third diffraction grating movably disposed between the second diffraction grating and the semi-reflective mirror along the optical axis; and measuring a second displacement in the direction of the optical axis from a second light intensity obtained by receiving an interference beam of the third $\pm n^{th}$ order beam and the fourth $\pm n^{th}$ order beam.

3. An apparatus for measuring a displacement, the apparatus comprising:

a light source configured to generate a parallel beam;

a total reflection mirror facing the light source, the total reflection mirror being movable along an optical axis of the parallel beam;

a semi-reflective mirror disposed along the optical axis between the light source and the total reflection mirror;

a first diffraction grating disposed along the optical axis between the light source and the semi-reflective mirror; and a first sensor configured to measure a light intensity, wherein the semi-reflective mirror generates a first reflected beam and a transmitted beam by reflecting and transmitting the parallel beam, respectively, the total reflection mirror generates a second reflected beam by reflecting the transmitted beam, the first diffraction grating divides the first reflected beam into a first $0^{th}$ order beam propagating in a direction same as that of the first reflected beam and a first $\pm n^{th}$ order beam having a diffraction angle with respect to the first $0^{th}$ order beam and the second reflected beam into a second $0^{th}$ order beam and a second $\pm n^{th}$ order beam having a diffraction angle with respect to the second $0^{th}$ order beam, and the first sensor measures a first light intensity by receiving an interference beam of the first $\pm n^{th}$ order beam and the second $\pm n^{th}$ order beam.

4. The apparatus of claim 3, further comprising:

a second diffraction grating disposed along the optical axis between the first diffraction grating and the semi-reflective mirror;

a third diffraction grating movably disposed between the second diffraction grating and the semi-reflective mirror along the optical axis; and a second sensor configured measure a light intensity, wherein the second diffraction grating divides the parallel beam passed through the first diffraction grating into a third $0^{th}$ order beam and a third $\pm n^{th}$ order beam having a diffraction angle with respect to the third $0^{th}$ order beam;

dividing the third $\pm n^{th}$ order beam into a fourth $0^{th}$ order beam and a fourth $\pm n^{th}$ order beam having a diffraction angle with respect to the fourth $0^{th}$ order beam; and the second sensor measures a second light intensity obtained by receiving an interference beam of the third $\pm n^{th}$ order beam and the fourth $\pm n^{th}$ order beam.

5. The apparatus of claim 4, further comprising an arithmetic unit connected to the second sensor, wherein the third diffraction grating includes a phase plate having stepped portions on a surface opposing the second diffraction grating, the second sensor includes a dual optical sensor configured to output a first signal having a sinusoidal waveform and a second signal having a cosine waveform in response to the second light intensity, and the arithmetic unit receives the first signal and the second signal to output a value obtained by dividing the first signal by the second signal.

6. The apparatus of claim 3, wherein the light source, the first diffraction grating, the semi-reflective mirror and the first sensor are disposed in a space within a transparent resin molded body, the total reflection mirror is disposed outside of the transparent resin molded body, and one of the transparent resin molded body and the total reflection mirror is movable along the optical axis such that the transparent resin molded body and the total reflection mirror are is movable relative to each other.

7. The apparatus of claim 4, wherein the light source, the first diffraction grating, the second diffraction grating, the third diffraction grating, the semi-reflective mirror and the first sensor and the second sensor are disposed in a space within a transparent resin molded body, the total reflection mirror is disposed outside of the transparent resin molded body, one of the transparent resin molded body and the total reflection minor is movable along the optical axis such that the transparent resin molded body and the total reflection mirror are is movable relative to each other, and the transparent resin molded body has an elasticity to enable an expansion and a contraction of the second diffraction grating and the third diffraction grating at a boundary therebetween such that the second diffraction grating and the third diffraction grating remain parallel to each other.

8. The apparatus of claim 5, wherein the light source, the first diffraction grating, the second diffraction grating, the third diffraction grating, the semi-reflective mirror and the first sensor and the second sensor are disposed in a space within a transparent resin molded body, the total reflection mirror is disposed outside of the transparent resin molded body, and one of the transparent resin molded body and the total reflection minor is movable along the optical axis such that the transparent resin molded body and the total reflection minor are is movable relative to each other, and the transparent resin molded body has an elasticity to enable an expansion and a contraction of the second diffraction grating and the third diffraction grating at a boundary therebetween such that the second diffraction grating and the third diffraction grating remain parallel to each other.

* * * * *